United States Patent
Stevens

(10) Patent No.: US 11,597,333 B2
(45) Date of Patent: Mar. 7, 2023

(54) VEHICLE CARGO AREA LINER SYSTEM

(71) Applicant: Michael J. Stevens, Fargo, ND (US)

(72) Inventor: Michael J. Stevens, Fargo, ND (US)

( * ) Notice: Subject to any disclaimer, the term of this patent is extended or adjusted under 35 U.S.C. 154(b) by 189 days.

(21) Appl. No.: 17/143,515

(22) Filed: Jan. 7, 2021

(65) Prior Publication Data
US 2022/0212610 A1    Jul. 7, 2022

(51) Int. Cl.
*B60R 13/01* (2006.01)
*B60P 7/04* (2006.01)

(52) U.S. Cl.
CPC ............... *B60R 13/01* (2013.01); *B60P 7/04* (2013.01); *B60R 2013/015* (2013.01)

(58) Field of Classification Search
CPC ..... B60R 13/01; B60R 2013/018; B60P 7/02; B60P 7/04; B60J 7/041; B60J 7/062; B60J 7/068; B60J 7/085; B60J 7/102; B60J 7/141; B60J 7/1607
USPC ................................................ 296/39.1, 39.2
See application file for complete search history.

(56) References Cited

U.S. PATENT DOCUMENTS

| | | | |
|---|---|---|---|
| 3,814,473 A | 6/1974 | Lorenzen, Jr. | |
| 4,279,439 A * | 7/1981 | Cantieri | B60R 13/01 105/423 |
| 4,789,574 A * | 12/1988 | Selvey | B60R 13/01 428/56 |
| 4,890,874 A * | 1/1990 | Davis | B60R 13/01 296/39.2 |
| 4,911,493 A | 3/1990 | Muirhead | |
| 4,968,548 A * | 11/1990 | Gibson | B60N 3/046 428/95 |
| 4,986,590 A * | 1/1991 | Patti | B60R 13/01 220/23.9 |
| 5,150,940 A | 9/1992 | Kennedy | |
| 5,221,119 A | 6/1993 | Emery | |
| 5,253,918 A * | 10/1993 | Wood | B62D 29/048 264/273 |
| 5,378,034 A * | 1/1995 | Nelsen | B60R 9/00 220/666 |
| 5,513,934 A | 5/1996 | German | |
| 5,636,883 A * | 6/1997 | Johns | B60J 11/06 296/136.02 |

(Continued)

OTHER PUBLICATIONS http://www.tufftruckbag.com/; Tuff Truck Bag Website; Received Apr. 9, 2018.

(Continued)

*Primary Examiner* — Gregory A Blankenship
(74) *Attorney, Agent, or Firm* — Neustel Law Offices

(57) ABSTRACT

A vehicle cargo area liner system for efficiently and removably lining a cargo area of a vehicle such as the bed of a pickup truck. The liner may be installed on the vehicle in addition to a hard shell liner as is common with pickup trucks. The liner includes a pair of inner connectors for removably securing the liner to the cargo area of the vehicle. The liner also includes a pair of outer connectors to which corresponding cover connectors on a cover may removably engage to removably secure a cover over the liner to enclose the cargo area. Securing connectors near the rear end of the liner may be utilized to secure the liner around a bed of a pickup truck. Straps may extend through openings in the liner to removably secure the front end of the liner to the cargo area.

27 Claims, 16 Drawing Sheets

(56) References Cited

U.S. PATENT DOCUMENTS

| | | | | |
|---|---|---|---|---|
| 5,722,710 | A * | 3/1998 | Falciani | B60R 13/01 296/39.1 |
| 6,131,983 | A * | 10/2000 | Jackson | B60R 13/01 296/39.1 |
| 7,243,971 | B1 | 7/2007 | McKeoun | |
| 8,061,761 | B1 * | 11/2011 | Sierra | G09F 21/048 296/136.01 |
| 8,430,441 | B2 * | 4/2013 | Waterman | B60R 13/01 296/183.1 |
| 8,840,166 | B1 * | 9/2014 | Derbes | B60R 5/041 224/403 |
| 9,744,917 | B2 * | 8/2017 | Petiteau | B60R 5/04 |
| 10,723,283 | B1 * | 7/2020 | Bellini | B60R 5/041 |
| 10,882,469 | B1 * | 1/2021 | Bacchus | B60R 13/01 |
| 11,214,204 | B2 * | 1/2022 | Riffe | B60R 13/01 |
| 2002/0096902 | A1 * | 7/2002 | Oswald | B60R 13/01 296/10 |
| 2009/0033121 | A1 | 2/2009 | McGorman | |
| 2009/0212584 | A1 * | 8/2009 | Hill | B60R 7/02 296/37.5 |
| 2014/0125083 | A1 | 5/2014 | Wise | |
| 2015/0125256 | A1 | 5/2015 | Bemis | |
| 2016/0144804 | A1 * | 5/2016 | Sugiura | B32B 3/06 296/183.1 |

OTHER PUBLICATIONS http://www.buybedbag.com/index.html; BedBag Disposable Truck Bed Liner Website; Received Apr. 9, 2018.

https://portabletruckbedliner.com/product/portable-truck-bed-liner/; Portable Truck Bed Liner Website; Received Apr. 9, 2018.

http://www.pickuppools.com/; Pick-up Pools Website; Received Apr. 9, 2018.

https://www.youtube.com/watch?v=zYZp48AxFTc; YouTube Webpage—"4Knines Pet Cargo Liner Installation Video For Your SUV Or Suburban" Video by 4Knines; Uploaded Feb. 2, 2015.

* cited by examiner

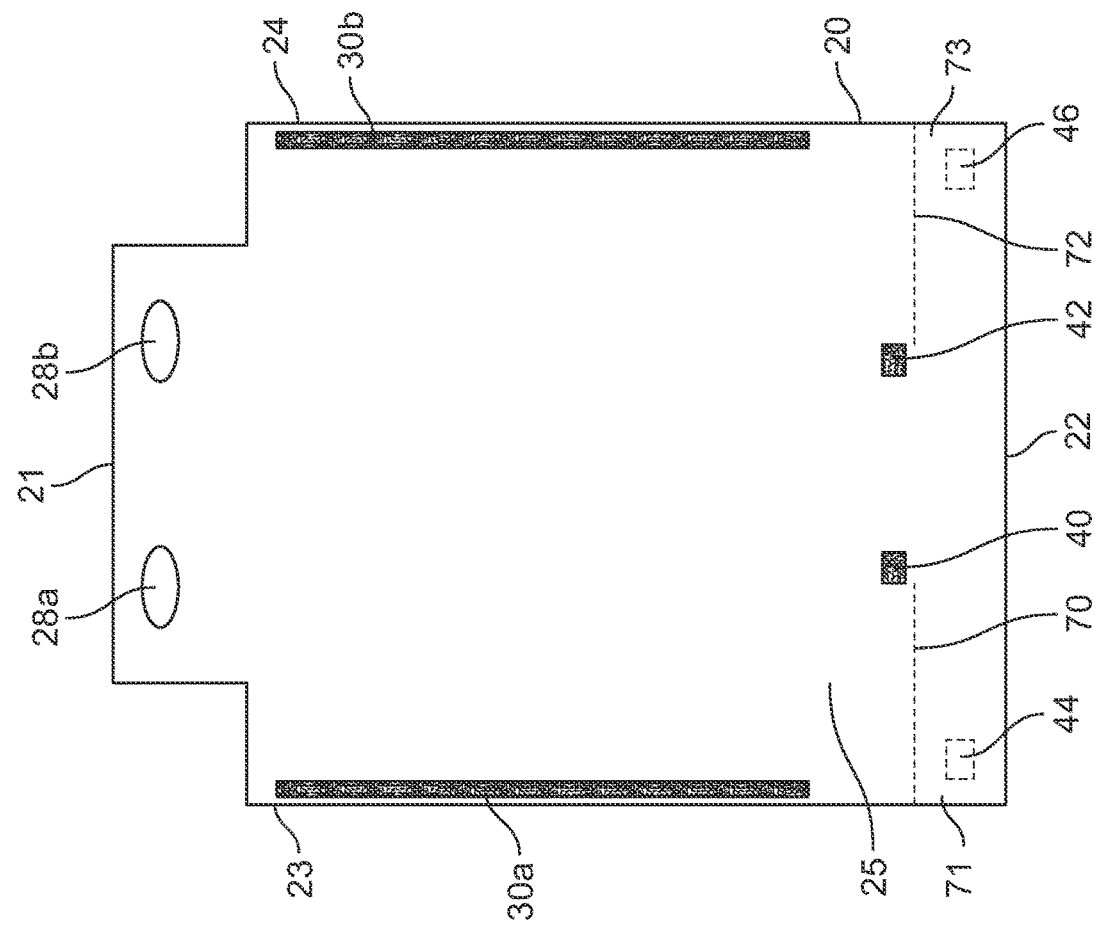

VEHICLE CARGO AREA LINER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a vehicle cargo area liner system for efficiently and removably lining a cargo area of a vehicle, such as the bed of a pickup truck.

Related Art

Any discussion of the related art throughout the specification should in no way be considered as an admission that such related art is widely known or forms part of common general knowledge in the field.

Vehicles such as pickup trucks are commonly used to haul a wide range of types of cargo. With cargo constantly being loaded and unloaded into the cargo area of the pickup truck, the pickup truck bed can be exposed to various types of damage during repeated use, such as but not limited to dents, staining, scratches, or other paint damage. In the past, bed liners have been used to protect such pickup truck beds from such types of damage.

Conventional pickup truck cargo bed liners serve the purpose of protecting the pickup truck cargo bed side walls, bed, and tailgate. Such conventional bed liners may be made of various types of heavy-duty materials which are either form-fit specific for the model and size of the pickup truck or spray-applied for permanent use.

However, such conventional pickup truck cargo bed liners require cleaning after each use, such as after fishing, hunting, lawn care, landscaping, and the like. Many conventional pickup truck cargo bed liners are configured such that materials being hauled can get under the liner, thus requiring the liner to be removed for cleaning and raising the probability of damage to the underlying bed. Fabric-based bed liners may become stained and require more aggressive and/or specialized cleaning to maintain.

SUMMARY

An example embodiment is directed to a vehicle cargo area liner system. The vehicle cargo area liner system includes a liner which is adapted to at least partially line the cargo area of a vehicle, such as the bed of a pickup truck. The liner may be installed on the vehicle in addition to a hard shell liner as is common with pickup trucks. The liner includes a pair of inner connectors for removably securing the liner to the cargo area of the vehicle. The liner also includes a pair of outer connectors to which corresponding cover connectors on a cover may removably engage to removably secure a cover over the liner to enclose the cargo area. Securing connectors near the rear end of the liner may be utilized to secure the liner around a bed of a pickup truck. Straps may extend through openings in the liner to removably secure the front end of the liner to the cargo area.

There has thus been outlined, rather broadly, some of the embodiments of the vehicle cargo area liner system in order that the detailed description thereof may be better understood, and in order that the present contribution to the art may be better appreciated. There are additional embodiments of the vehicle cargo area liner system that will be described hereinafter and that will form the subject matter of the claims appended hereto. In this respect, before explaining at least one embodiment of the vehicle cargo area liner system in detail, it is to be understood that the vehicle cargo area liner system is not limited in its application to the details of construction or to the arrangements of the components set forth in the following description or illustrated in the drawings. The vehicle cargo area liner system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

FIG. 16 is a top view of a liner of a vehicle cargo area liner system in accordance with an example embodiment.

DETAILED DESCRIPTION

A. Overview

Figure 1:
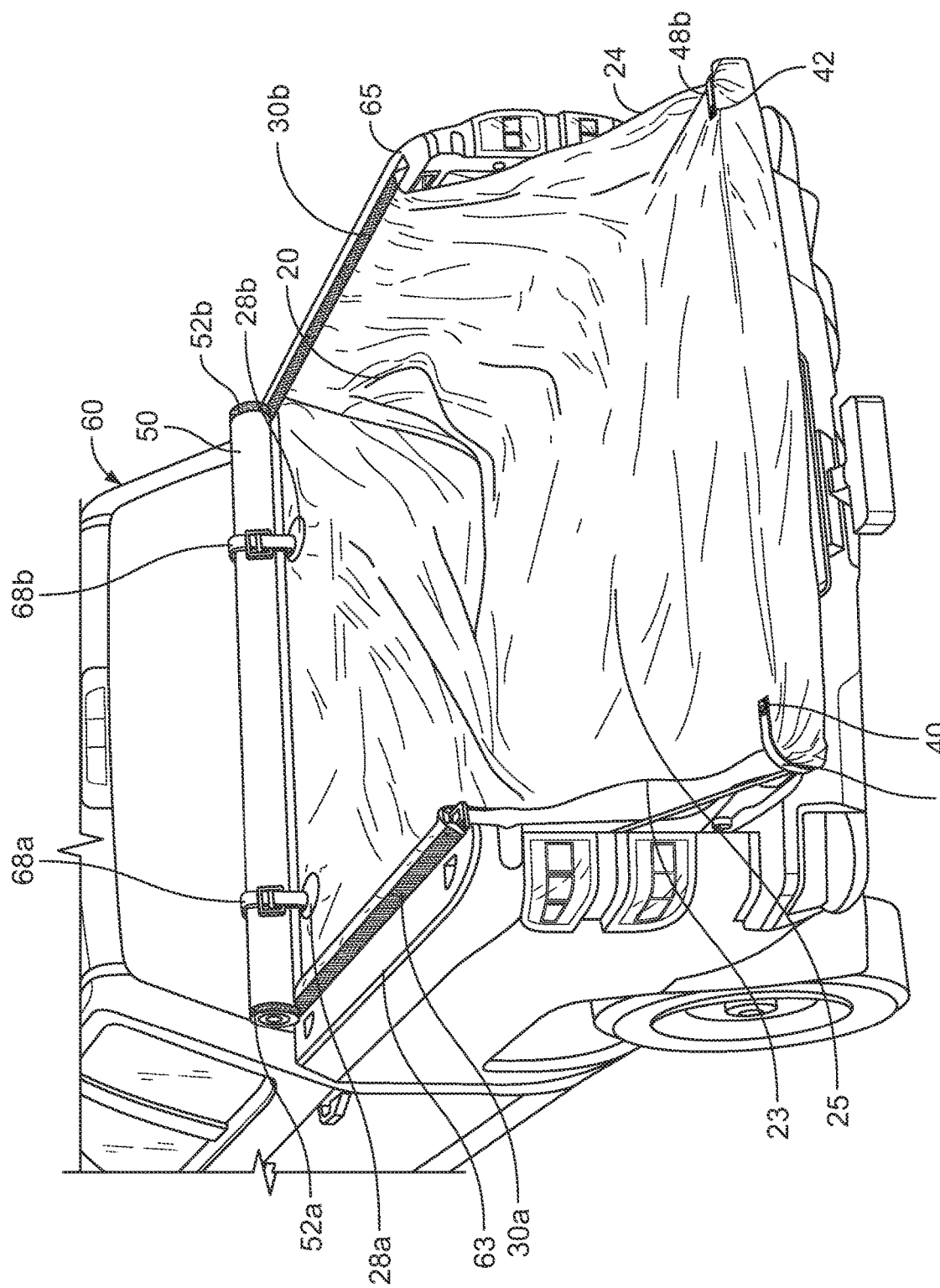
FIG. 1 is a perspective view of a vehicle cargo area liner system in use on a vehicle in accordance with an example embodiment.

An example vehicle cargo area liner system generally comprises a liner 20 adapted to at least partially cover a cargo area 61 of a vehicle 60. The liner 20 is comprised of a first end 21, a second end 22, a first side 23, a second side 24, an outer surface 25, and an inner surface 26. A first inner connector 35a is positioned on the inner surface 26 of the liner 20 for connecting the liner 20 to the cargo area 61 of the vehicle 60. A second inner connector 35b is positioned on the inner surface 26 of the liner 20 for connecting the liner 20 to the cargo area 61 of the vehicle 60. A first outer connector 30a is positioned on the outer surface 25 of the liner 20 for connecting a cover 50 to the liner 20. A second outer connector 30b is positioned on the outer surface 25 of the liner 20 for connecting the cover 50 to the liner 20. The first and second inner connectors 35a, 35b may each be comprised of hook-and-loop fasteners 36a, 36b or snap couplers 37a, 37b. The first and second outer connectors 30a, 30b may each be comprised of hook-and-loop fasteners 31a, 31b or snap couplers 32a, 32b.

The first inner connector 35a may be comprised of a first strip extending along the first side 23 of the inner surface 26 of the liner 20 and the second inner connector 35b may be comprised of a second strip extending along the second side 24 of the inner surface 26 of the liner 20. The first outer connector 30a may be comprised of a third strip extending along the first side 23 of the outer surface 25 of the liner 20 and the second outer connector 30b may be comprised of a fourth strip extending along the second side 24 of the outer surface 25 of the liner 20.

The liner 20 may comprise at least one opening 28a, 28b positioned near the first end 21 of the liner 20. The liner 20 may comprise one or more securing connectors 40, 42, 44, 46 positioned near the second end 22 of the liner 20. The first outer connector 30a and the second outer connector 30b may each be connected to the outer surface 25 of the liner 20. The first inner connector 35a and the second inner connector 35b may each be connected to the inner surface 26 of the liner 20. The vehicle 60 may be comprised of a pickup truck and the cargo area 61 may be comprised of a bed 62 of the pickup truck.

In another exemplary embodiment, the vehicle cargo area liner system may comprise a vehicle 60 including a cargo area 61, with the cargo area 61 comprising a first sidewall 63 and a second sidewall 65. A first sidewall connector 64 may be positioned on the first sidewall 63 and a second sidewall connector 66 may be positioned on the second sidewall 65. A cover 50 may be adapted to at least partially enclose the cargo area 61 of the vehicle 60. A first cover connector 52a may be positioned on a first side of the cover 50 and a second cover connector 52b may be positioned on a second side of the cover 50.

A liner 20 may be adapted to at least partially cover the cargo area 61 of the vehicle 60, with the liner 20 being comprised of a first end 21, a second end 22, a first side 23, a second side 24, an outer surface 25, and an inner surface 26. A first inner connector 35a may be positioned on the inner surface 26 of the liner 20 for connecting the liner 20 to the cargo area 61 of the vehicle 60. The first inner connector 35a may be adapted to engage with the first sidewall connector 64. A second inner connector 35b may be positioned on the inner surface 26 of the liner 20 for connecting the liner 20 to the cargo area 61 of the vehicle 60, with the second liner connector 35b being adapted to engage with the second sidewall connector 66. A first outer connector 30a may be positioned on the outer surface 25 of the liner 20 for connecting the cover 50 to the liner 20, with the first outer connector 30a being adapted to engage with the first cover connector 52a. A second outer connector 30b may be positioned on the outer surface 25 of the liner 20 for connecting the cover 50 to the liner 20, with the second outer connector 30b being adapted to engage with the second cover connector 52b. The first inner connector 35a, the second inner connector 35b, the first sidewall connector 64, and the second sidewall connector 66 may be comprised of hook-and-loop fasteners or snap couplers. The first outer connector 30a, the second outer connector 30b, the first cover connector 52a, and the second cover connector 52b may also be comprised of hook-and-loop fasteners or snap couplers.

A pair of securing connectors 40, 42, 44, 46 may be positioned near the second end 22 of the liner 20 for securing the liner 20 to a tailgate 69 of the vehicle 60. A securing strap 48a, 48b may be adapted to be connected between the pair of securing connectors 40, 42, 44, 46 for securing the liner 20 to the tailgate 69 of the vehicle 60. The liner 20 may comprise at least one opening 28a, 28b near the first end 21 of the liner 20 and a strap 68a, 68b adapted to extend through the at least one opening 28a, 28b of the liner 20 and around the cover 50.

An exemplary method of installing a liner 20 to at least partially line a cargo area 61 of a vehicle 60 may comprise the steps of attaching the first side 23 of the liner 20 to the first sidewall 63 of the cargo area 61 by engaging the first inner connector 35a of the liner 20 with the first sidewall connector 64 of the first sidewall 63; attaching the second side 24 of the liner 20 to the second sidewall 65 of the cargo area 61 by engaging the second inner connector 35b of the liner 20 with the second sidewall connector 66 of the second sidewall 65; attaching the first end 21 of the liner 20 to a front end of the cargo area 61 by securing a strap 68a, 68b through at least one opening 28a, 28b of the liner 20 and around the cover 50; and attaching the second end 22 of the liner 20 to a tailgate 69 of the cargo area 61 by wrapping the second end 22 of the liner 20 around the tailgate 69 of the cargo area 61.

B. Liner

As shown throughout the figures, the methods and systems described herein utilize a liner 20 which is adapted to be attached to at least partially cover the cargo area 61 of a vehicle 60 in a manner that protects the cargo area 61 of the vehicle 60 from damage, exposure to biological matter such as fluids, and the like. Preferably, the liner 20 will be both removable and disposable such that the liner 20 may be easily attached to and removed from the vehicle 60 and then disposed of. However, in some situations such as when transporting dry materials, the liner 20 may instead be simply removed and retained for future use.

While the figures illustrate use of the liner 20 in connection with the bed 62 of a vehicle 60 comprised of a truck, it should be appreciated that the liner 20 may be utilized with a wide range of vehicles 60, including various types of vehicles 60 not shown in the figures but known in the art to include a cargo area 61. By way of example, the liner 20 may be utilized in connection with vehicles 60 such as automobiles including sport-utility-vehicles, boats, airplanes, trains, trailers, and any other vehicle 60 which may benefit from a removable liner 20 being temporarily installed to at least partially cover its cargo area 61.

As best shown in FIGS. 5, 6, 10, and 11, it can be seen that the liner 20 may comprise a substantially rectangular sheet of flexible material such as plastics, fabrics, and the like. While the figures illustrate that the liner 20 is rectangular in shape, it should be appreciated that other shapes may be utilized to suit different types of cargo areas 61 of different types of vehicles 60. In the exemplary embodiments shown in the figures, it can be seen that the liner 20 comprises a first end 21, a second end 22, a first side 23, and a second side 24.

The first end 21 of the liner 20 generally comprises the front end of the liner 20 which is adapted to be positioned at or near the front end of the cargo area 61 such as shown in FIG. 1. The second end 22 of the liner 20 generally comprises the rear end of the liner 20 which is adapted to be positioned at or near the rear end of the cargo area 61. In some embodiments such as shown in FIG. 1, the liner 20 may be positioned so as to extend onto the tailgate 69 of a vehicle 60 such as a truck, in which case the second end 22 of the liner 20 may be positioned so as to extend at least partially around the tailgate 69 as discussed herein.

The first side 23 of the liner 20 is adapted to be removably secured along or near the first side of the cargo area 61 of a vehicle 60. The second side 24 of the liner 20 is adapted to be removably secured along or near the second side of the cargo area 61 of the vehicle 60. In the exemplary embodiment shown in FIG. 1, it can be seen that the first side 23 of the liner 20 is secured along a first sidewall 63 of a bed 62 and that the second side 24 of the liner 20 is secured along a second sidewall 65 of the bed 62. As discussed below, the first side 23 of the liner 20 may be secured along the first side of the cargo area 61 by use of a first inner connector 35a of the liner 20 engaging with a first sidewall connector 64 of the vehicle 60 and the second side 24 of the liner 20 may be secured along the second side of the cargo area 61 by use of a second inner connector 35b engaging with a second sidewall connector 66 of the vehicle 60.

As best shown in FIGS. 5, 6, 10, and 11, the liner 20 includes an outer surface 25 and an inner surface 26. When installed to at least partially cover the cargo area 61 of a vehicle 60, the inner surface 26 of the liner 20 is positioned to face against the cargo area 61 (typically downwardly) and the outer surface 25 of the liner 20 is positioned to face away from the cargo area 61 (typically upwardly). The thickness of the liner 20 may vary in different embodiments to suit different types of materials being transported in the cargo area 61. A thicker liner 20 may be desirable when transporting materials that may have sharp edges such as antlers, metal, construction materials, tree limbs, or the like, while a thinner liner 20 may be desirable when transporting particulate materials such as leaves, grass clippings, sand, dirt, or the like.

As best shown in FIGS. 1, 2, 5, 6, 10, 11, and 14, the first end 21 of the liner 20 may include one or more openings 28a, 28b for use in securing the liner 20 to the cargo area 61. In the exemplary embodiment shown in the figures, the liner 20 includes a first opening 28a and a second opening 28b. It should be appreciated that more or less openings 28a, 28b may be utilized in different embodiments. It should also be appreciated that the shape, size, orientation, positioning, and spacing of the openings 28a, 28b may vary in different embodiments.

In the exemplary embodiment shown in the figures, a pair of oval-shaped openings 28a, 28b is positioned near the first end 21 of the liner 20. Although not shown, in some embodiments, additional openings 28a, 28b may be positioned at various other locations on the liner 20, such as but not limited to near the second end 22, first side 23, and/or second side 24 of the liner 20. In some embodiments, each of the first end 21, second end 22, first side 23, and second side 24 of the liner 20 may include one or more openings 28a, 28b which may be utilized to tie down or otherwise secure the liner 20 to at least partially cover the cargo area 61 of a vehicle 60, or as hand-holds for removing the liner 20.

FIG. 16 illustrates an alternate embodiment in which the liner 20 is shaped so as to more tightly fit within the cargo area 61 of the vehicle 60. As shown in FIG. 16, such an embodiment of the liner 20 is not rectangular in shape. The first end 21 of the liner 20 is narrower than the overall body of the liner 20, with square-shaped cutouts on either side of the first end 21 of the liner 20. A first slot 70 extends inwardly from the first side 23 of the liner 20 near its second end 22 and a second slot 72 extends inwardly from the second side 24 of the liner 20 near its second end 22.

The first slot 70 comprises a cut in the liner 20 which defines a first flap 71 adapted to wrap around the tailgate 69 and the second slot 72 comprises a cut in the liner 20 which defines a second flap 73 adapted to wrap around the tailgate 69. The first and second securing connectors 40, 42 are positioned on the outer surface 25 of the liner 20 and the third and fourth securing connectors 44, 46 are positioned on the inner surface 26 of the liner 20, such that the first securing connector 40 may engage with the third securing connector 44 and the second securing connector 42 may engage with the fourth securing connector 46 when the flaps 71, 73 are wrapped around the tailgate 69.

C. Liner Connectors

Figure 2:
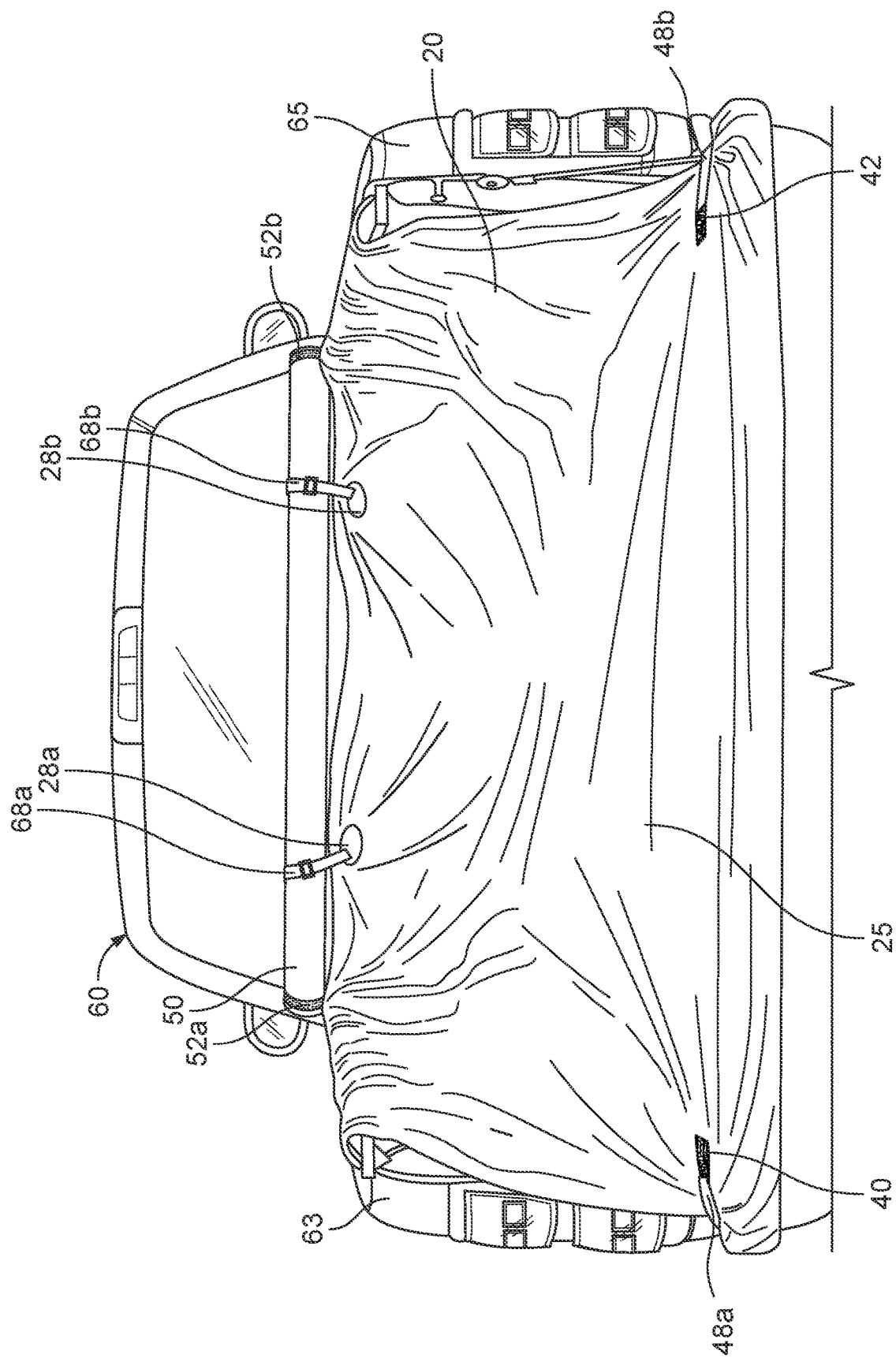
FIG. 2 is a rear view of a vehicle cargo area liner system in use on a vehicle in accordance with an example embodiment.
Figure 3:
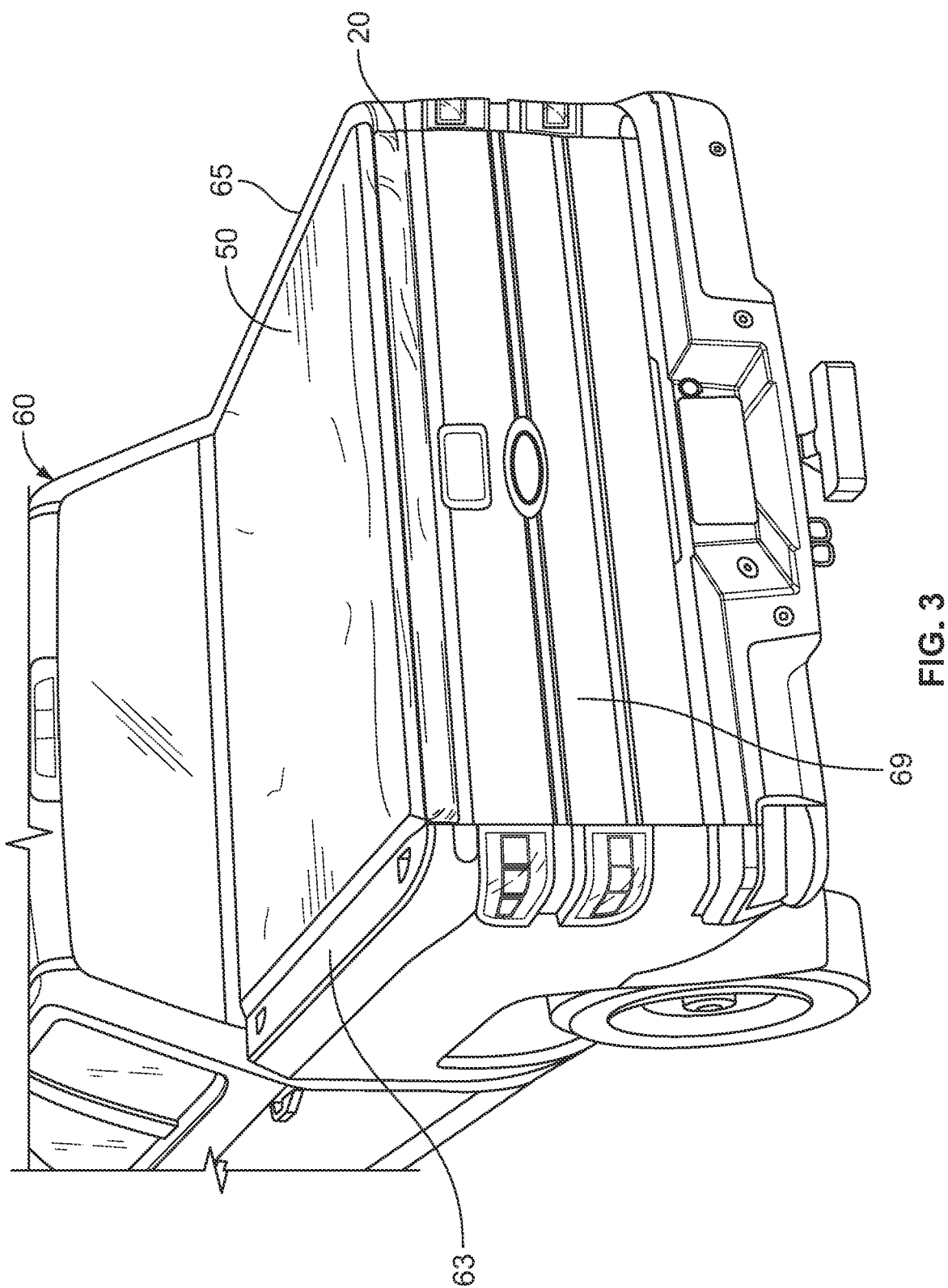
FIG. 3 is a perspective view of a vehicle cargo area liner system in use with a closed cover in accordance with an example embodiment.
Figure 6:
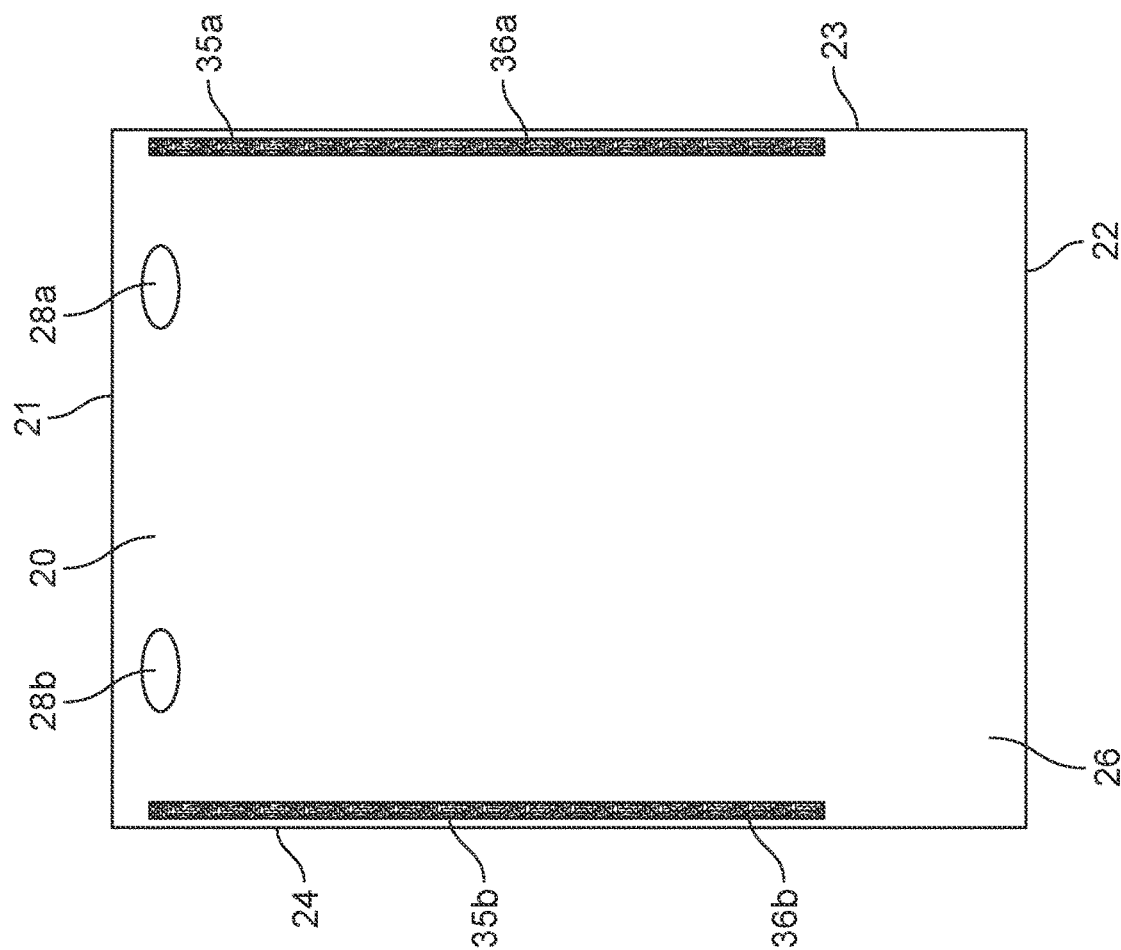
FIG. 6 is a bottom view of a liner of a vehicle cargo area liner system in accordance with an example embodiment.
Figure 11:
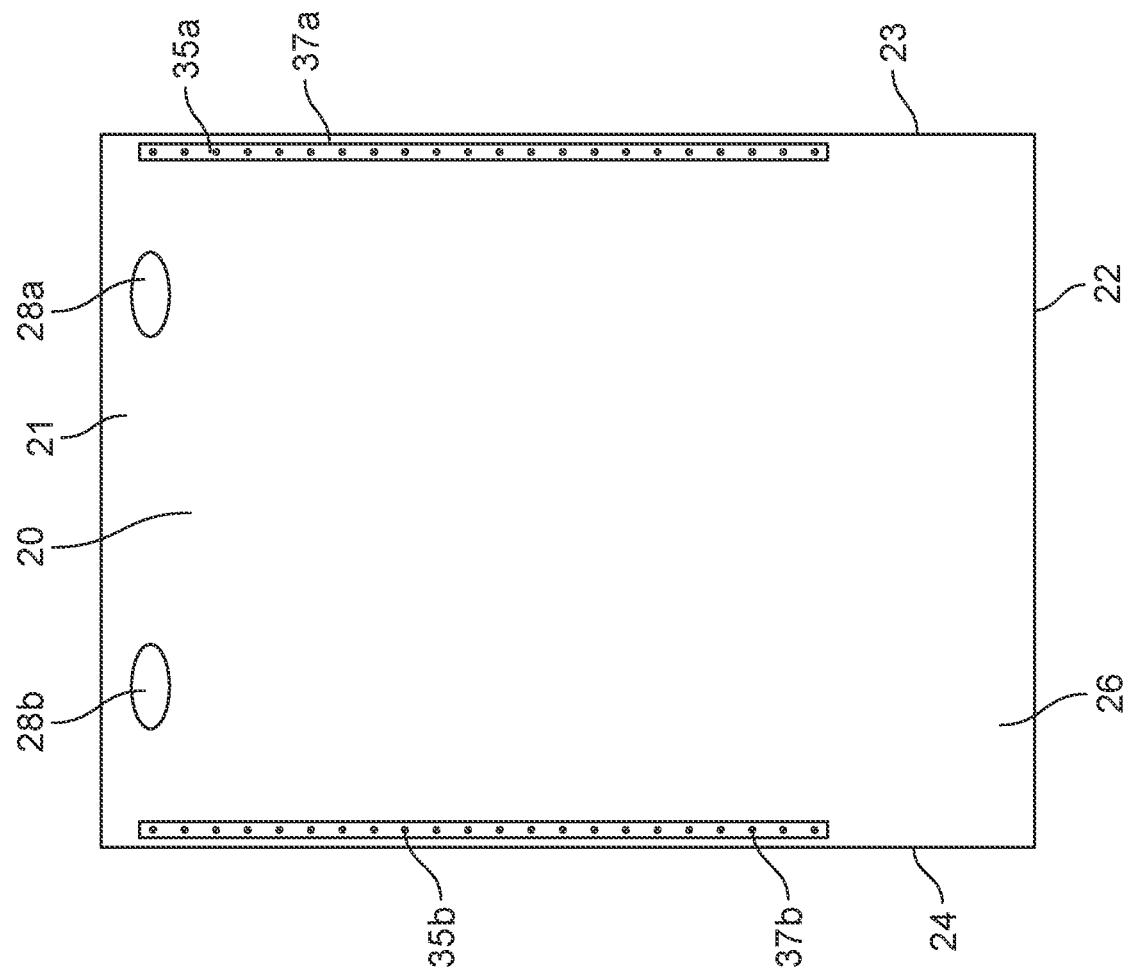
FIG. 11 is a bottom view of a liner of a vehicle cargo area liner system in accordance with an example embodiment.

As best shown in FIGS. 6 and 11, the liner 20 may include at least one inner connector 35a, 35b positioned on its inner surface 26 and at least one outer connector 30a, 30b positioned on its outer surface 25. The inner connectors 35a, 35b are utilized to secure the liner 20 to at least partially cover the cargo area 61 of the vehicle 60 such as shown in FIGS. 1-3. The outer connectors 30a, 30b are utilized to secure a cover 50 to enclose the cargo area 61 of the vehicle 60 such as shown in FIG. 3.

The types of connectors 30a, 30b, 35a, 35b utilized may vary in different embodiments. In the embodiments shown in FIGS. 5 and 6, the outer connectors 30a, 30b are illustrated as comprising outer fasteners 31a, 31b and the inner connectors 35a, 35b are illustrated as comprising inner fasteners 36a, 36b. A wide range of types of fasteners 31a, 31b, 36a, 36b may be utilized, such as but not limited to hook-and-loop fasteners 31a, 31b, 36a, 36b such as shown in the figures. In other embodiments the fasteners 31a, 31b, 36a, 36b may comprise screws, bolts, nails, adhesives, and the like.

Figure 10:
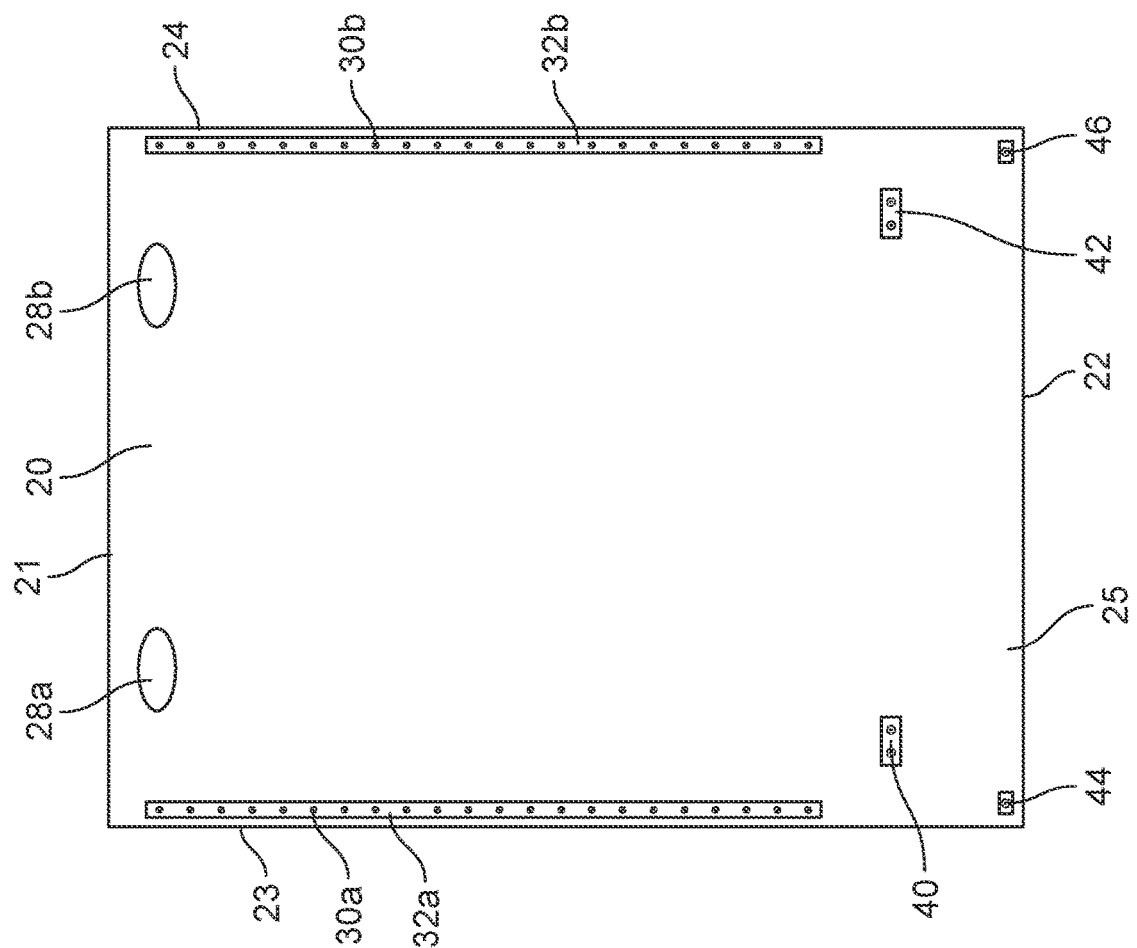
FIG. 10 is a top view of a liner of a vehicle cargo area liner system in accordance with an example embodiment.

In an alternate embodiment such as shown in FIGS. 10-11, the outer connectors 30a, 30b are illustrated as comprising outer couplers 32a, 32b and the inner connectors 35a, 35b are illustrated as comprising inner couplers 37a, 37b. The couplers 32a, 32b, 37a, 37b may comprise various types of couplers such as but not limited to snaps, buttons, clasps, C-channels, brackets, magnetically-attractive materials, male/female interlocking members, and the like. The outer couplers 32a, 32b may comprise male or female couplers so as to engage with the cover connectors 52a, 52b, which may similarly comprise either male or female couplers. The inner couplers 37a, 37b may comprise male or female couplers so as to engage with the first and second sidewall connectors 64, 66, which may also comprise either male or female couplers.

The figures illustrate an exemplary embodiment in which the same connection type is utilized for both the outer connectors 30a, 30b and the inner connectors 35a, 35b of the liner 20. It should be appreciated, however, that in some embodiments different connection types may be utilized. Such an embodiment may be necessary in situations in which the cover connectors 52a, 52b which engage with the outer connectors 30a, 30b are a different type than the sidewall connectors 64, 66 which engage with the inner connectors 35a, 35b. For example, in some embodiments, the outer connectors 30a, 30b may comprise outer fasteners 31a, 31b and the inner connectors 35a, 35b may comprise inner couplers 37a, 37b. In other embodiments, the outer connectors 30a, 30b may comprise outer couplers 32a, 32b and the inner connectors 35a, 35b may comprise inner fasteners 36a, 36b.

As best shown in FIGS. 6 and 11, the inner surface 26 of the liner 20 may include one or more inner connectors 35a, 35b which are adapted to engage with corresponding sidewall connectors 64, 66 of the vehicle 60. In the exemplary embodiment shown in FIG. 7, it can be seen that the first sidewall 63 of the truck bed 62 includes a first sidewall connector 64 and the second sidewall 65 of the truck bed 62 includes a second sidewall connector 66. The first inner connector 35a is adapted to removably engage with the first sidewall connector 64 and the second inner connector 35b is adapted to removably engage with the second sidewall connector 66.

In some embodiments, the first sidewall connector 64 and the second side wall connector 66 may each comprise an elongated member such as a rail. In such embodiments, the sides 23, 24 of the liner 20 may be secured to the first and second sidewalls 63, 65 by engaging with such an elongated member. For example, the first and second inner connectors 35a, 35b may each comprise a bracket such as a C-channel or other receiver which is adapted to engage with the elongated members such as rails.

Figure 7:
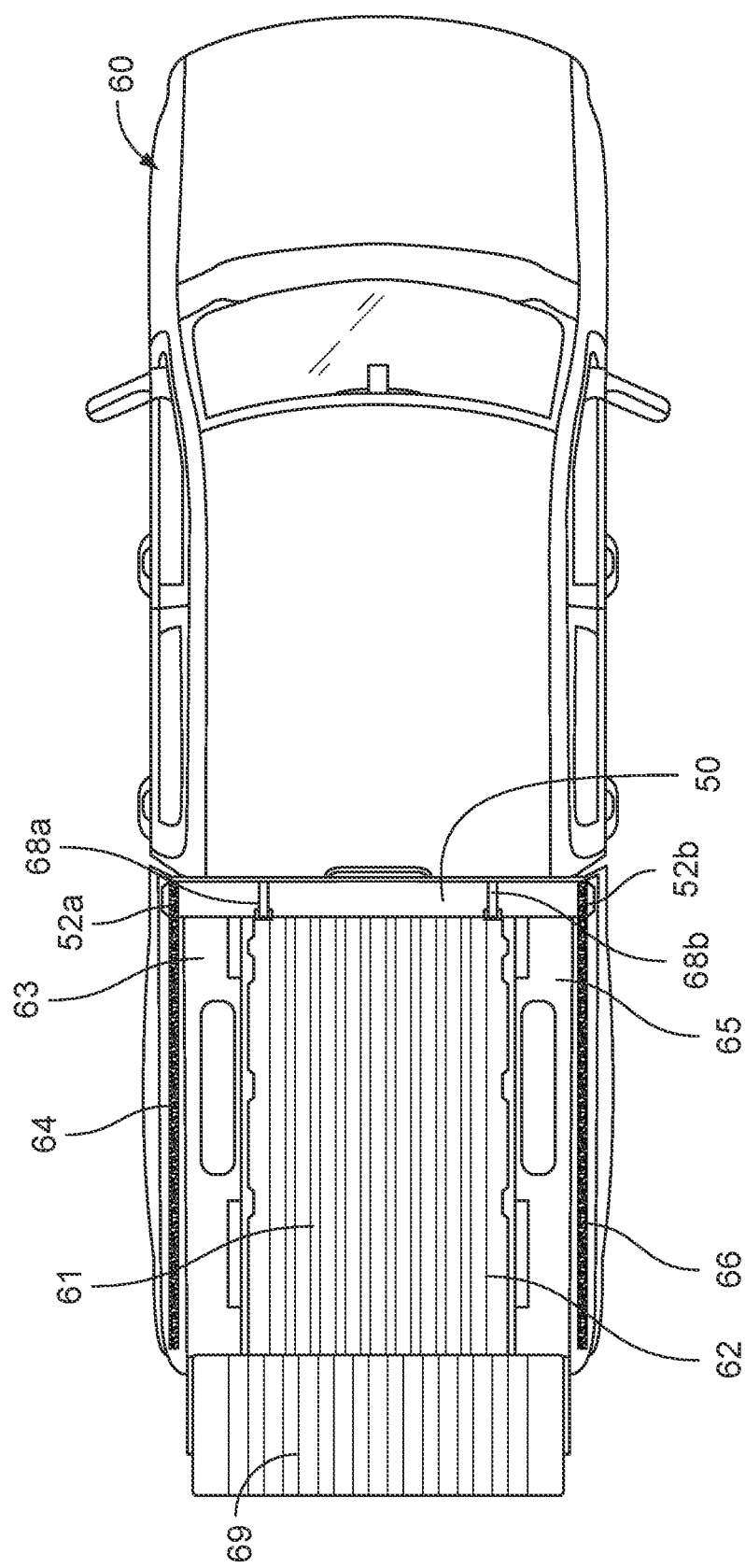
FIG. 7 is a top view of a vehicle prior to being lined with a vehicle cargo area liner system in accordance with an example embodiment.
Figure 12:
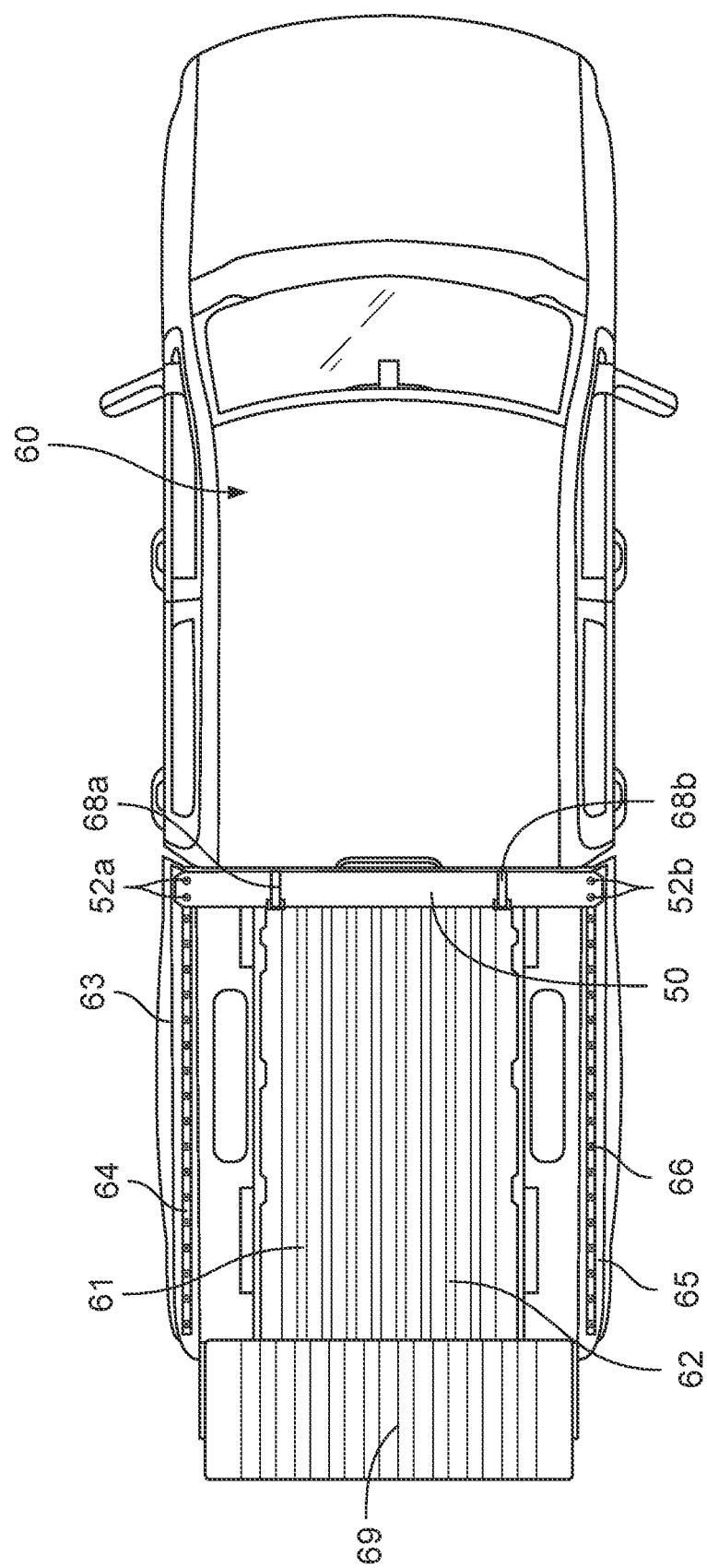
FIG. 12 is a top view of a vehicle prior to being lined of a vehicle cargo area liner system in accordance with an example embodiment.

The sidewall connectors 64, 66 may be integrated with the vehicle 60, or may be connected to the vehicle 60 such as with an after-market hard shell bed liner that is commonly used in connection with truck beds 62. The type of connection used by the sidewall connectors 64, 66 may vary in different embodiments. FIG. 7 illustrates an embodiment in which the sidewall connectors 64, 66 are comprised of hook-and-loop fasteners. FIG. 12 illustrates an embodiment in which the sidewall connectors 64, 66 are comprised of couplers. Various other connection types may be utilized such as but not limited to screws, bolts, nails, adhesives, snaps, buttons, clasps, brackets, magnetically-attractive materials, and the like. In some embodiments, the first and second sidewall connectors 64, 66 may comprise rails or the like, with, for example, a first rail extending along the first sidewall 63 and a second rail extending along the second sidewall 65.

In some embodiments, the inner connectors 35a, 35b may comprise male or female engaging members such as channel connectors or brackets. In such embodiments, the corresponding sidewall connectors 64, 66 will comprise male or female engaging members such as channel connectors or brackets. For example, the inner connectors 35a, 35b could each comprise a male engaging member such as a rigid projection and the sidewall connectors 64, 66 could each comprise a female engaging member such as a rigid bracket or C-channel to which the rigid projection of each of the inner connectors 35a, 35b may matingly engage. Conversely, the inner connectors 35a, 35b could each comprise the female engaging member and the sidewall connectors 64, 66 could each comprise the male engaging member. In yet another embodiment, the inner connectors 35a, 35b could each comprise a C-channel which is adapted to matingly engage directly to a rail on each of the sidewalls 63, 65 of the vehicle 60. Thus, the first inner connector 35a may be adapted to matingly engage with the first sidewall connector 64 and the second inner connector 35b may be adapted to matingly engage with the second sidewall connector 66.

With reference to FIGS. 6 and 11, it can be seen that the liner 20 includes a first inner connector 35a near the first side 23 of the inner surface 26 of the liner 20 and a second inner connector 35b near the second side 24 of the inner surface 26 of the liner 20. In the exemplary embodiments shown in the figures, each of the inner connectors 35a, 35b is shown as comprising an elongated member such as a strip which includes either inner fasteners 36a, 36b as shown in FIG. 6 or inner couplers 37a, 37b as shown in FIG. 11.

It should be appreciated that, in some embodiments, strips may not be utilized. Instead, the inner connectors 35a, 35b may be interspersed along the inner surface 26 of the liner 20. The inner connectors 35a, 35b may be distally-spaced with respect to each other. For example, the liner 20 could have one or more inner fasteners 36a, 36b or inner couplers 37a, 37b that are not interconnected with each other, but instead distally-spaced along the inner surface 26 of the liner 20. In some embodiments, only a single first inner connector 35a and a single second inner connector 35b may be utilized.

In the exemplary embodiments shown in FIGS. 6 and 11, it can be seen that the inner connectors 35a, 35b are shown as extending along the sides 23, 24 of the liner 20 between the first and second ends 21, 22 of the liner 20. Such a configuration ensures that the liner 20 is firmed secured along its entire length to the cargo area 61 of the vehicle 60 and thus prevent any portion of the liner 20 from flapping around when in use, thus creating a gap in which materials can slide underneath the liner 20 and directly onto the cargo area 61. The inner connectors 35a, 35b may also extend along the first and/or second ends 21, 22 of the liner 20 in some embodiments.

In other embodiments, the inner connectors 35a, 35b may not extend for the majority of the length of the liner 20. For example, the inner connectors 35a, 35b may in some embodiments be only positioned at or near the respective ends 21, 22 of the liner 20. In some embodiments, the inner connectors 35a, 35b may be positioned at the respective corners of the inner surface 26 of the liner 20. In further embodiments, the inner connectors 35a, 35b may extend around the entire perimeter near the outer edge of the inner surface 26 of the liner 20.

Figure 5:
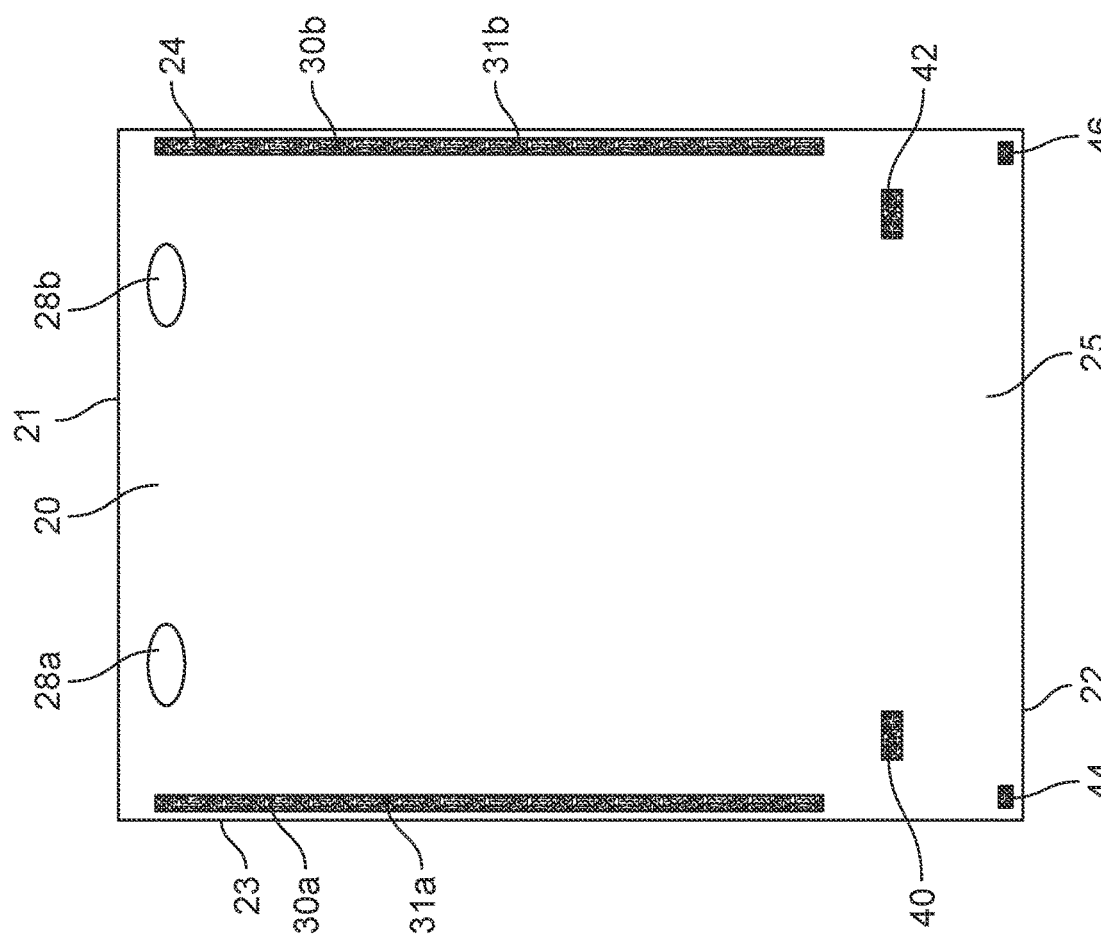
FIG. 5 is a top view of a liner of a vehicle cargo area liner system in accordance with an example embodiment.

As best shown in FIGS. 5 and 10, the outer surface 25 of the liner 20 may include one or more outer connectors 30a, 30b which are adapted to engage with corresponding cover connectors 52a, 52b on the cover 50 such that the cover 50 may be removably secured against the outer surface 25 of the liner 20. In the exemplary embodiment shown in FIG. 2, it can be seen that the cover 50 includes a first cover connector 52a along its first side and a second cover connector 52b along its second side. The first outer connector 30a is adapted to removably engage with the first cover connector 52a and the second outer connector 30b is adapted to removably engage with the second cover connector 52b.

Figure 8:
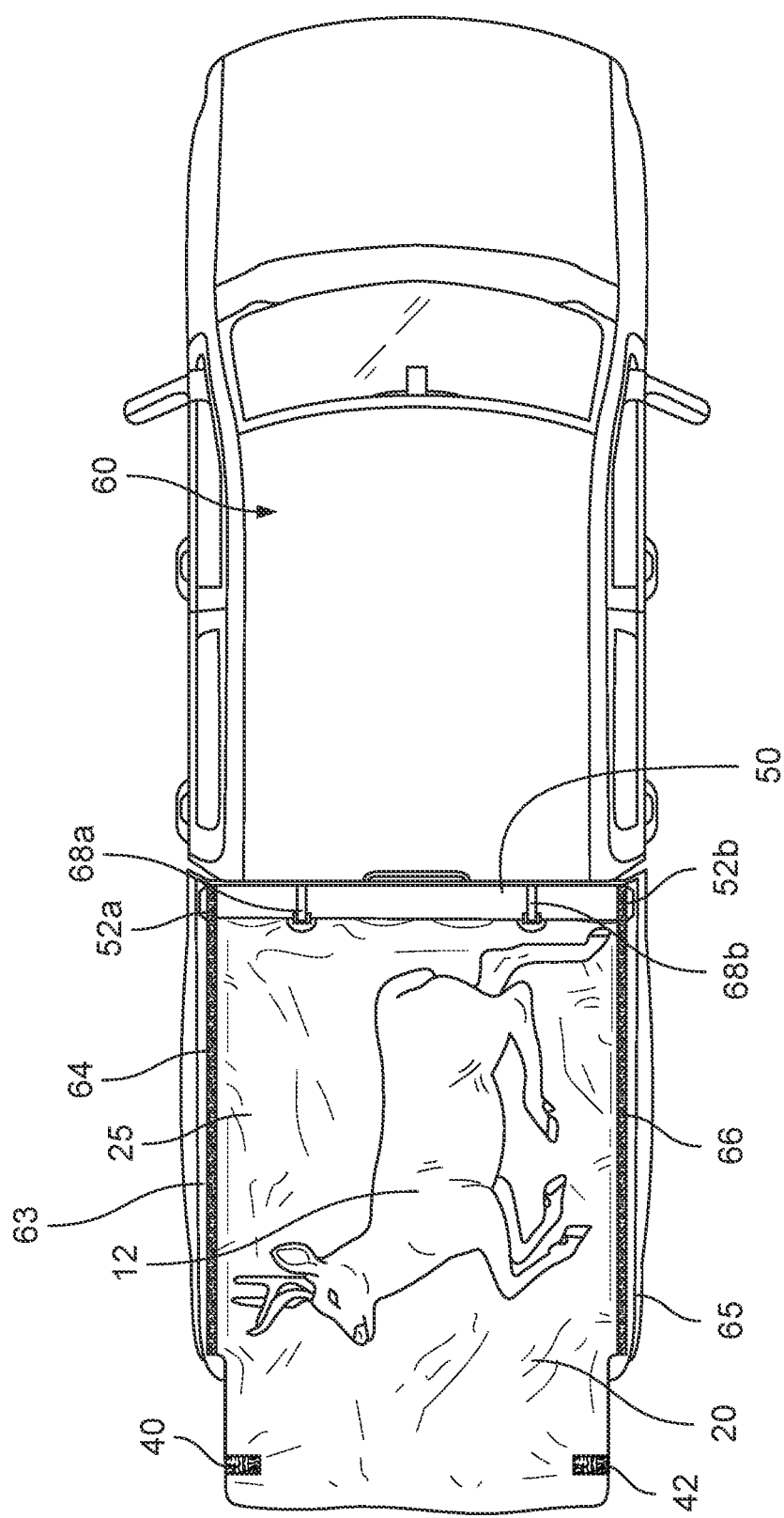
FIG. 8 is a top view of a vehicle with a lined cargo area containing cargo of a vehicle cargo area liner system in accordance with an example embodiment.
Figure 9:
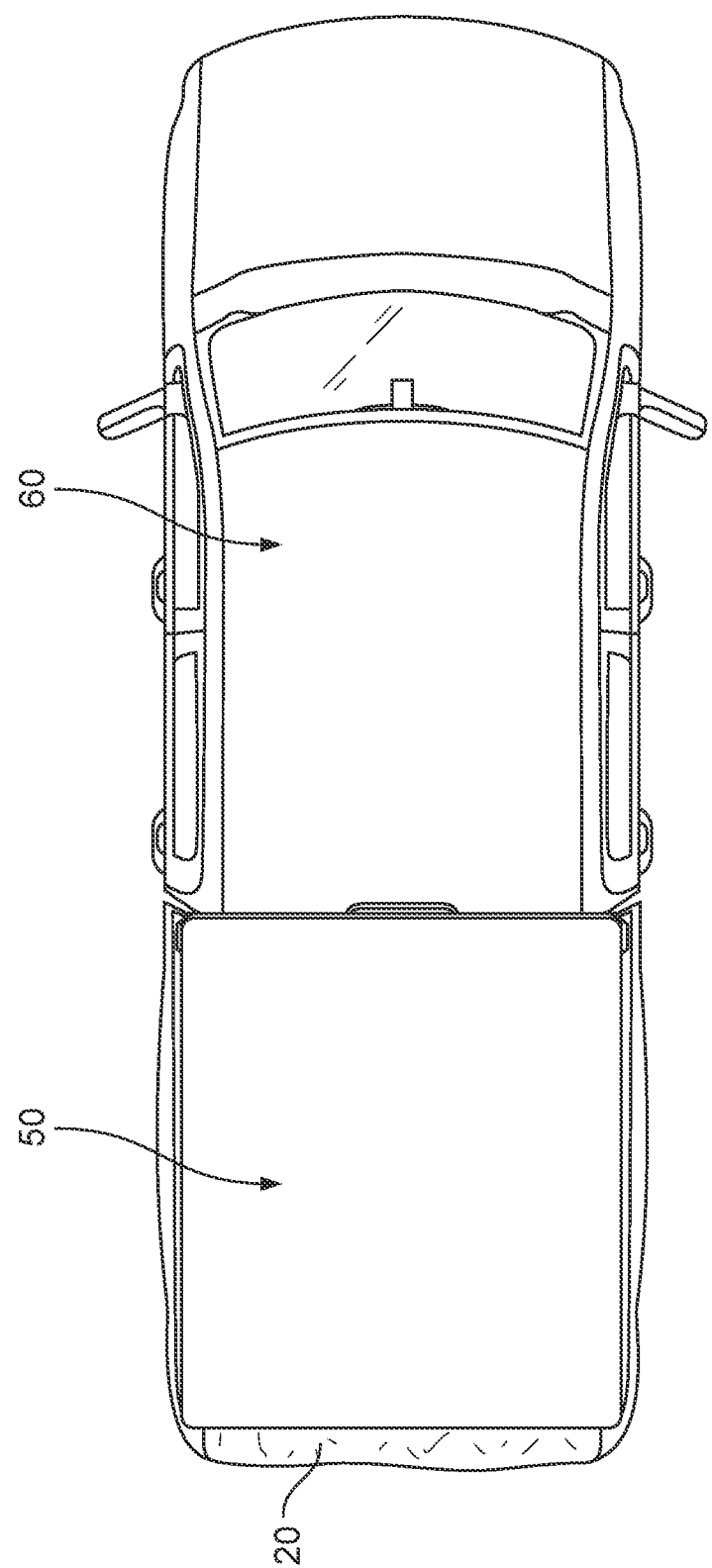
FIG. 9 is a top view of a vehicle with a covered, lined cargo area of a vehicle cargo area liner system in accordance with an example embodiment.

The cover connectors 52a, 52b are generally comprised of strips of couplers or fasteners which are positioned at or near the outer sides of the cover 50. The cover connectors 52a, 52b are adapted to be rolled-up with the cover 50 when the cover 50 is in its opened, retracted position, such as shown in FIG. 8. As the cover 50 is unrolled into its closed, extended position such as shown in FIG. 9, the first cover connector 52a will engage with the first outer connector 30a and the second cover connector 52b will engage with the second outer connector 30b. Thus, the cover connectors 52a, 52b will preferably be positioned upon the cover 50 such that they are aligned with the respective outer connectors 30a, 30b on the outer surface 25 of the liner 20.

Figure 13:
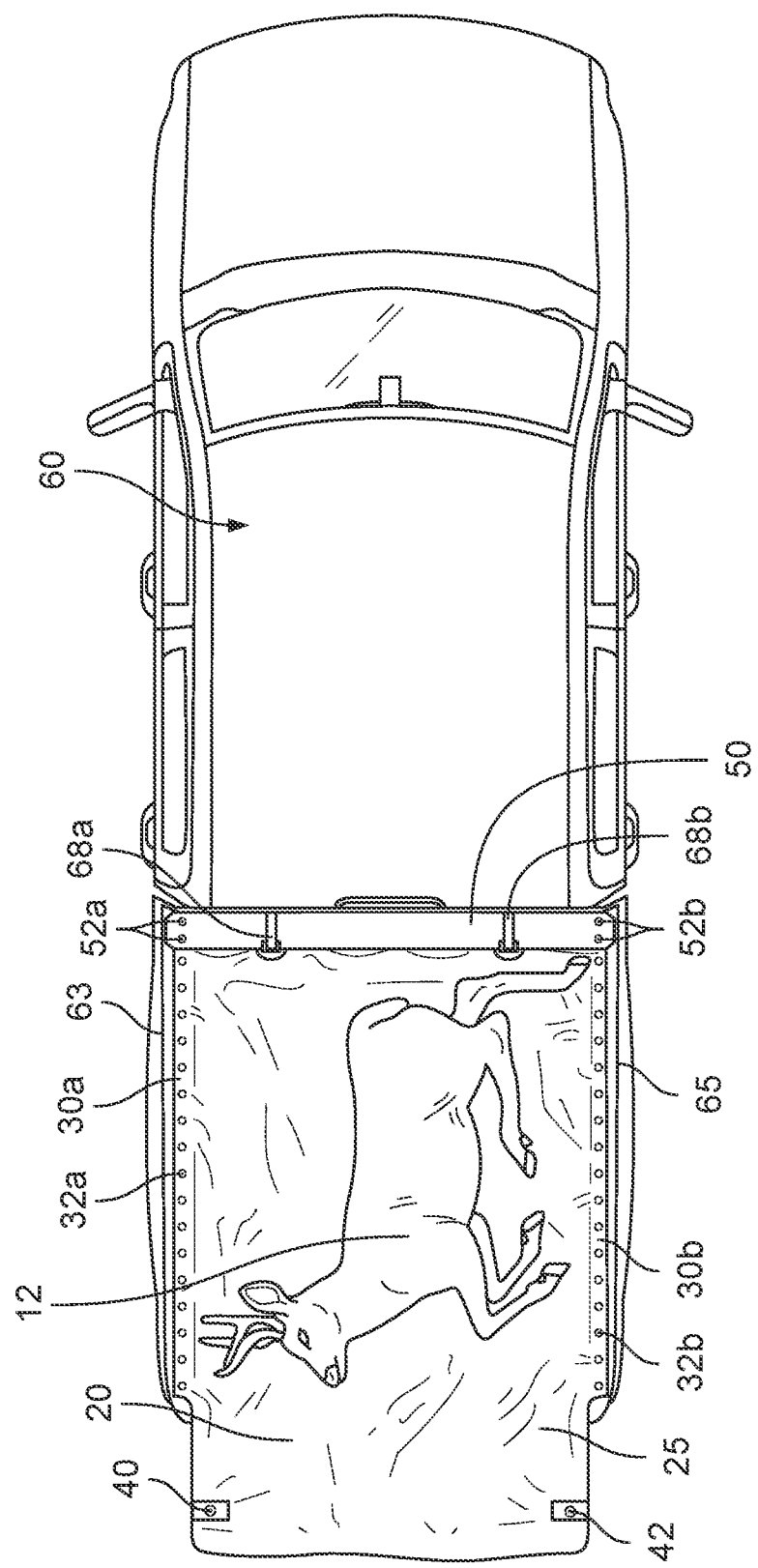
FIG. 13 is a top view of a vehicle with a lined cargo area containing cargo of a vehicle cargo area liner system in accordance with an example embodiment.

FIGS. 7 and 8 illustrate an exemplary embodiment in which the cover connectors 52a, 52b are comprised of fasteners. FIGS. 12 and 13 illustrate an exemplary embodiment in which the cover connectors 52a, 52b are comprised of couplers. Various other connection types may be utilized for the cover connectors 52a, 52b such as but not limited to screws, bolts, nails, adhesives, snaps, buttons, clasps, brackets, C-channels, male/female engaging members, magnetically-attractive materials, and the like.

With reference to FIGS. 5 and 10, it can be seen that the liner 20 includes a first outer connector 30a near the first side 23 of the outer surface 25 of the liner 20 and a second outer connector 30b near the second side 24 of the outer surface 25 of the liner 20. In the exemplary embodiments shown in the figures, each of the outer connectors 30a, 30b is shown as comprising an elongated member such as a strip which includes either outer fasteners 31a, 31b as shown in FIG. 5 or outer couplers 32a, 32b as shown in FIG. 10.

It should be appreciated that, in some embodiments, strips may not be utilized. Instead, the outer connectors 30a, 30b may be interspersed along the outer surface 25 of the liner 20. The outer connectors 30a, 30b may be distally-spaced with respect to each other. For example, the liner 20 could have one or more outer fasteners 31a, 31b or outer couplers 32a, 32b that are not interconnected with each other, but instead distally-spaced along the outer surface 25 of the liner 20. In some embodiments, only a single first outer connector 30a and a single second outer connector 30b may be utilized.

In the exemplary embodiments shown in FIGS. 5 and 10, it can be seen that the outer connectors 30a, 30b are shown as extending along the sides 23, 24 of the outer surface 25 of the liner 20 between the first and second ends 21, 22 of the liner 20. Such a configuration ensures that the cover 50 is firmed secured along its entire length to the liner 20 to ensure there are no gaps between the cover 50 and the liner 20 which would expose the cargo area 61 of the vehicle 60. The outer connectors 30a, 30b may also extend along the first and/or second ends 21, 22 of the outer surface 25 of the liner 20 in some embodiments.

In other embodiments, the outer connectors 30a, 30b may not extend for the majority of the length of the liner 20. For example, the outer connectors 30a, 30b may in some embodiments be only positioned at or near the respective ends 21, 22 of the liner 20. In some embodiments, the outer connectors 30a, 30b may be positioned at the respective corners of the outer surface 25 of the liner 20. In further embodiments, the outer connectors 30a, 30b may extend around the entire perimeter near the outer edge of the inner surface 26 of the liner 20.

In some embodiments, the liner 20 may be adapted to close in on itself, with the two sides 23, 24 of the liner 20 being brought together to temporarily close the liner 20. In such embodiments, either of the outer connectors 30a, 30b may be adapted to engage with a corresponding one of the inner connectors 35a, 35b on the opposite side 23, 24 of the liner 20. In the exemplary embodiment shown in FIG. 15, it can be seen that the first inner connector 35a is engaged with the second outer connector 30b so as to connect the respective sides 23, 24 of the liner 20 together so that the liner 20 may be closed in on itself. It should be appreciated that an opposite configuration may also be utilized, in which the second inner connector 35b is instead engaged with the first outer connector 30a. Such an embodiment may be desirable when, for example, cargo 12 comprised of leaves or other dry materials are being transported.

In some embodiments, the outer connectors 30a, 30b may be on the respective sides 23, 24 of the liner 20 and the inner connectors 35a, 35b may be inwardly-offset with respect to the sides 23, 24 of the liner 20. In such embodiments, the liner 20 may be first connected by its inner connectors 35a, 35b to the vehicle 60, with the sides 23, 24 of the liner 20 extending past the sidewalls 63, 65 of the vehicle 60. In such embodiments, the liner 20 may then be closed in upon itself, with the first outer connector 30a engaging with the second inner connector 35b, or with the second outer connector 30b engaging with the first inner connector 35a, to close the liner 20 and thus enclose the cargo area 61 without use of a separate cover 50.

D. Securing Connectors

As best shown in FIGS. 5 and 10, the liner 20 may include securing connectors 40, 42, 44, 46 which are utilized to secure the second end 22 of the liner 20 to the cargo area 61 of the vehicle 60. In the exemplary embodiment shown in FIG. 1 in which the vehicle 60 is comprised of a truck, the securing connectors 40, 42, 44, 46 are utilized to secure the second end 22 of the liner 20 to the bed 62 of the vehicle 60. In this manner, the entire cargo area 61 of the vehicle 60 may be lined, including the bed 62 which forms a wall of the cargo area 61 when closed.

The type and number of securing connectors 40, 42, 44, 46 may vary in different embodiments. The securing connectors 40, 42, 44, 46 may comprise fasteners such as screws, bolts, nails, adhesives and the like as shown in FIG. 5. The securing connectors 40, 42, 44, 46 may comprise couplers such as snaps, buttons, clasps, brackets, magnetically-attractive materials, and the like as shown in FIG. 10.

Generally, the second end 22 of the liner 20 will be wrapped around the bed 62 of the vehicle 60, with the securing connectors 40, 42, 44, 46 functioning to secure the liner 20 in place wrapped around the bed 62. Thus, the securing connectors 40, 42, 44, 46 are generally all positioned upon the outer surface 25 of the liner 20.

Figure 14:
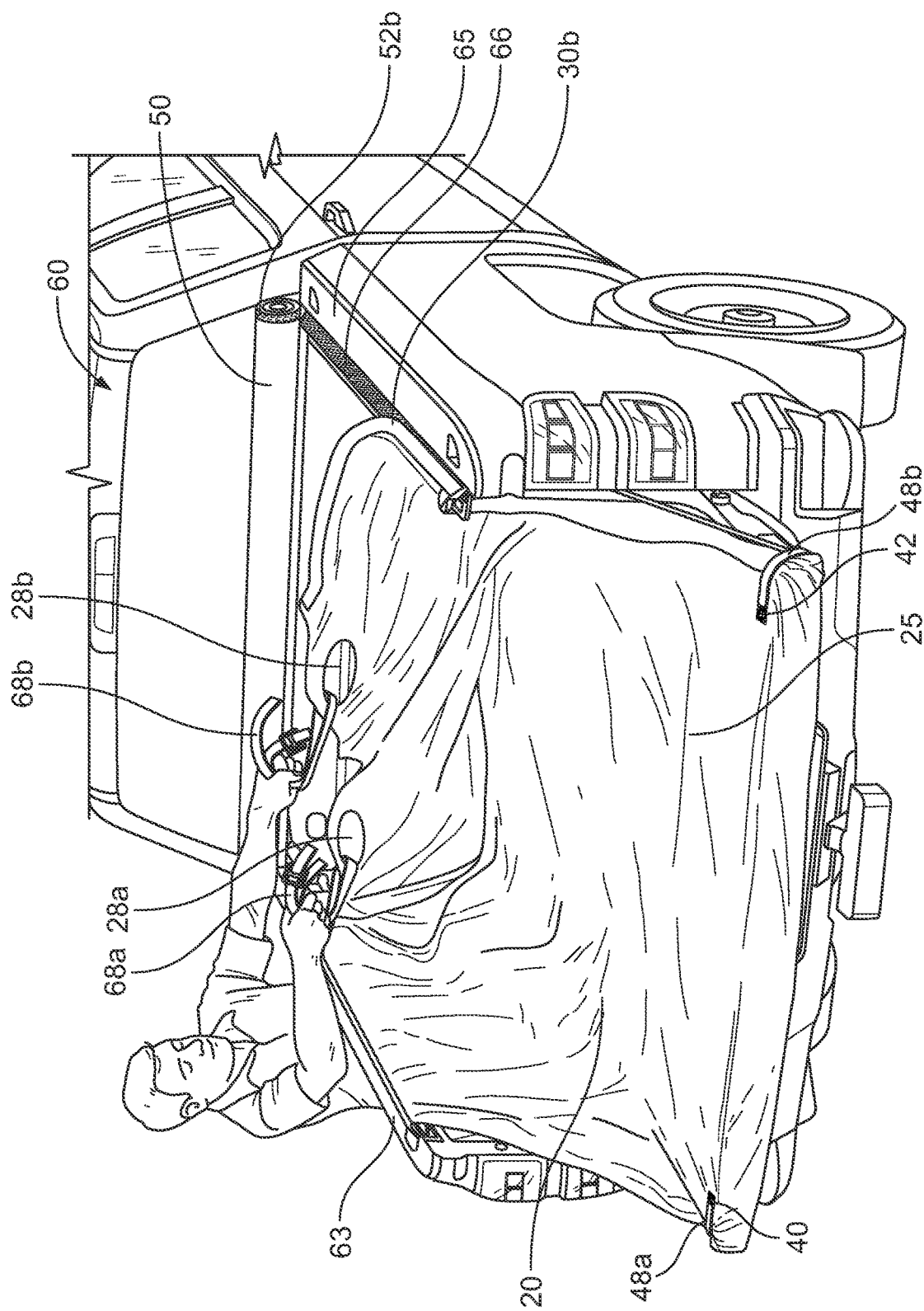
FIG. 14 is a perspective view of a liner being removed from a vehicle of a vehicle cargo area liner system in accordance with an example embodiment.

The manner in which the securing connectors 40, 42, 44, 46 operate may vary in different embodiments. For example, in some embodiments, securing straps 48a, 48b may be utilized, with the first securing strap 48a being connected between the first securing connector 40 and the third securing connector 44, and a second securing strap 48b being connected between the second securing connector 42 and the fourth securing connector 46 such as shown in FIGS. 2 and 14. In such an embodiment, the liner 20 is wrapped around the bed 62 such that the first and second securing connectors 40, 42 are facing upwardly, and the third and fourth securing connectors 44, 46 are facing downwardly, with the securing straps 48a, 48b being secured to extend between the upward-facing first and second securing connectors 40, 42 and the downward-facing third and fourth securing connectors 44, 46.

In other embodiments, securing straps 48a, 48b may be omitted entirely, with the securing connectors 40, 42, 44, 46 instead engaging directly with each other. For example, the first securing connector 40 may be adapted to engage directly with the third securing connector 44, and the second securing connector 42 may be adapted to engage with the fourth securing connector 46. In such an embodiment, the second end 22 of the liner 20 is wrapped entirely around the bed 62 of the vehicle 60 such that the third and fourth securing connectors 44, 46 are wrapped and rotated to press down upon the corresponding first and second securing connectors 40, 42.

The positioning, orientation, and spacing of the securing connectors 40, 42, 44, 46 may vary in different embodiments. In the exemplary embodiment best shown in FIGS. 5 and 10, the third securing connector 44 is positioned at the corner between the first side 23 and the second end 22 of the outer surface 25 of the liner 20. The fourth securing connector 46 is positioned at the corner between the second side 24 and the second end 22 of the outer surface 25 of the liner 20.

Continuing to reference FIGS. 5 and 10, it can be seen that the first securing connector 40 is positioned diagonally with respect to the third securing connector 44 in a position which is further away from both the second end 22 and the first side 23 of the liner 20 than the third securing connector 44. The second securing connector 42 is positioned diagonally with respect to the fourth securing connector 46 in a position which is further away from the second end 22 and the second side 24 of the liner 20 than the fourth securing connector 46. In some embodiments, the first and second securing connectors 40, 42 may instead be positioned closer to the respective sides 23, 24 of the outer surface 25 of the liner 20 such that they are aligned with the respective third and fourth securing connectors 44, 46.

E. Vehicle

The systems and methods described herein may be utilized to securely and removably protect the cargo area 61 of various types of vehicles 60 such as but not limited to automobiles including sport-utility-vehicles, boats, airplanes, trains, trailers, and any other vehicle 60 which may benefit from a removable liner 20 being temporarily installed to at least partially cover its cargo area 61. While the figures illustrate exemplary embodiments in use with a vehicle 60 comprised of a pickup truck, it should be appreciated that the same principles may be applied to cover cargo areas 61 of various other types of vehicles 60.

The systems and methods described herein may be utilized to at least partially cover a cargo area 61 of a vehicle 60 with a removable liner 20, with the liner 20 being either reusable or disposable. The types of cargo areas 61 acceptable for use with the liner 20 may vary widely in both type and dimensions. The liner 20 will generally be longer and wider than the length and width of the cargo area 61 to ensure that the liner 20 may adequately cover all surfaces of the cargo area 61 if desired.

Various types of cargo areas 61 may be lined. In the exemplary embodiment best shown in FIGS. 1-4, 7-9, and 12-14, the cargo area 61 is shown as comprising the bed 62 of a vehicle 60 comprised of a pickup truck. In such an embodiment, the cargo area 61 is defined by a front wall to which the first end 21 of the liner 20 may be secured, such as by use of straps 68a, 68b extending through the openings 28a, 28b near the first end 21 of the liner 20 such as shown in FIGS. 1 and 2.

The cargo area 61 may include a cover 50 which is positioned adjacent to the front wall of the cargo area 61. The cover 50 may be integrated with the vehicle 60 in some embodiments, or may be an aftermarket accessory. The cover 50 may comprise a standard bed cover as is known in the art to selectively and removably cover the top of a bed 62 of a vehicle 60 such as shown in FIG. 3. Thus, the cover 50 may be rolled up and stored adjacent to the front end 21 of the liner 20 when not in use. The cover 50 may be secured in such a rolled position by use of a pair of straps 68a, 68b such as shown in FIG. 2.

The respective sides of the cover 50, and more particularly the inner surface of the cover 50, may include cover connectors 52a, 52b which are aligned to removably engage with the outer connectors 30a, 30b of the liner 20 such as shown in FIG. 1 and described herein. The cover connectors 52a, 52b may comprise various types of fasteners or various types of couplers depending upon the type of outer fasteners 31a, 31b or outer couplers 32a, 32B on the outer surface 25 of the liner 20.

While the figures illustrate a flexible, rolled-up cover 50, it should be appreciated that different types of covers 50 may be utilized. For example, the cover 50 may comprise a rigid, rectangular cover 50 which is fully removed from the vehicle 60 when not in use rather than being rolled up as shown in the figures. In some embodiments, the cover 50 may be foldable for easy storage when removed from the vehicle 60. Such rigid or semi-rigid, fully-removable covers 50 will generally include a first cover connector 52a extending along or adjacent to the first side of the cover 50 on its inner surface and a second cover connector 52b extending along or adjacent to the second side of the cover 50 on its inner surface.

The cargo area 61 will generally include a pair of sidewalls 63, 65 which, in combination with the front wall and rear wall, define the cargo area 61. The rear wall of the cargo area 61 will generally be comprised of an access door for the cargo area 61, such as a tailgate 69 as shown in the figures. In this manner, the cargo area 61 may be loaded by opening, such as lowering, the rear wall, such as the tailgate 69, of the cargo area 61 of the vehicle 60.

As shown in FIGS. 7 and 12, the vehicle 60 will generally include a pair of sidewall connectors 64, 66 to which the respective first and second inner connectors 35a, 35b of the liner 20 are removably engaged so as to removably attach the liner 20 to the vehicle 60. The sidewall connectors 64, 66 may be connected to or integrated with the sidewalls 63, 65 of the cargo area 61. The sidewall connectors 64, 66 will preferably be positioned on top of the sidewalls 63, 65, but may in some embodiments be positioned at various other locations on the sidewalls 63, 65. In some embodiments, the sidewalls 63, 65 may each include a rail which is either integrated or connected to each of the sidewalls 63, 65. In some embodiments, such rails may incorporate the cover connectors 52a, 52b, or the cover connectors 52a, 52b may be connected to such rails.

The sidewall connectors 64, 66 may be integrated with the vehicle 60 upon manufacture, or may be comprised of aftermarket accessories that are installed on the vehicle 60. For example, hard shell bed liners which are commonly installed on pickup trucks may include such sidewall connectors 64, 66. Alternatively, the sidewall connectors 64, 66 may be independently installed on the vehicle 60 to provide points to which the liner 20 may be connected by the inner connectors 35a, 35b.

In the exemplary embodiment shown in FIG. 7, the first sidewall connector 64 is positioned along a first sidewall 63 of the vehicle 60 and the second sidewall connector 66 is positioned along a second sidewall 65 of the vehicle 60. The first sidewall connector 64 may be positioned at various locations with respect to the first sidewall 63, such as above, below, or to either side. Similarly, the second sidewall connector 66 may be positioned at various locations with respect to the second sidewall 65, such as above, below, or to either side.

The sidewall connectors 64, 66 may comprise various types of fasteners, such as but not limited to hook-and-loop fasteners, screws, bolts, nails, adhesives, and the like. The sidewall connectors 64, 66 may also comprise various types of couplers, such as but not limited to snaps, buttons, clasps, brackets, magnetically-attractive materials, and the like. The sidewall connectors 64, 66 may also in some embodiments comprise elongated members such as rails that extend along at least a portion of the length of each of the sidewalls 63, 65.

The sidewall connectors 64, 66 may extend along the entire length of the sidewalls 63, 65 such as shown in FIGS. 7 and 12, or may only partially cover the length of the sidewalls 63, 65. In some embodiments, the sidewall connectors 64, 66 may be interspersed along the length of the respective sidewalls 63, 65, rather than extending as a continuous strip such as shown in the figures.

For example, in some embodiments, a pair of first sidewall connectors 64 may be positioned at the respective ends of the first sidewall 63 and a pair of second sidewall connectors 66 may be positioned at the respective ends of the second sidewall 65. As a further example, in some embodiments, a single first sidewall connector 64 may be positioned centrally along the length of the first sidewall 63 and a single second sidewall connector 66 may be positioned centrally along the length of the second sidewall 65.

With respect to the rear wall of the cargo area 61, the liner 20 will generally include securing connectors 40, 42, 44, 46 on its outer surface 25 for use in securing the second end 22 of the liner 20 around the rear wall of the cargo area 61. In FIG. 2, it can be seen that the securing connectors 40, 42, 44, 46 may be utilized in combination with securing straps 48a, 48b to secure the liner 20 to cover a bed 62 of a vehicle 60 comprised of a pickup truck.

F. Operation of Preferred Embodiment

The liner 20 may be connected to at least partially cover the cargo area 61 of the vehicle 60. Generally, the first end 21 of the liner 20 may be secured to cover the front end of the cargo area 61 by use of straps 68a, 68b extending through the openings 28a, 28b of the liner 20. The second end 22 of the liner 20 may be secured to cover the rear end of the cargo area 61 by use of the securing connectors 40, 42, 44, 46, either by themselves or in combination with the use of securing straps 48a, 48b. The first side 23 of the liner 20 may be secured to cover the first side of the cargo area 61 by use of the first inner connector 35a of the liner 20. The second side 24 of the liner 20 may be secured to cover the second side of the cargo area 61 by use of the second inner connector 35b of the liner 20.

In this manner, the entire cargo area 61 may be lined by the liner 20, with the first end 21 of the liner 20 being secured to the front wall of the cargo area 61, the second end 22 of the liner 20 being secured to the rear wall (e.g., bed 62) of the cargo area 61, the first side 23 of the liner 20 being secured to the first sidewall 63 of the cargo area 61, and the second side 24 of the liner 20 being secured to the second sidewall 65 of the cargo area 61.

In use, the liner 20 is first secured to at least partially cover the cargo area 61 of the vehicle 60. The order in which the respective ends 21, 22 and sides 23, 24 of the liner 20 are connected to cover the cargo area 61 may vary depending upon the preferences of the user. Thus, the following description is not meant to be limiting with respect to the order of steps performed.

Generally, the sides 23, 24 of the liner 20 will first be connected to the sidewalls 63, 65 of the cargo area 61 of the vehicle 60. The first side 23 of the liner 20 is positioned over the first sidewall 63 such that the first inner connector 35a of the inner surface 26 of the liner 20 is aligned with the first sidewall connector 64 of the first sidewall 63 of the cargo area 61 of the vehicle 60. The second side 24 of the liner 20 is positioned over the second sidewall 65 such that the second inner connector 35b of the inner surface 26 of the liner 20 is aligned with the second sidewall connector 66 of the second sidewall 65 of the cargo area 61 of the vehicle 60.

With the inner connectors 35a, 35b aligned with the sidewall connectors 64, 66, they may be engaged to removably attach the sides 23, 24 of the liner 20 to the sidewalls 63, 65 of the cargo area 61. In embodiments in which inner fasteners 36a, 36b are utilized, the liner 20 may only need to be positioned over the sidewalls 63, 65, with the inner fasteners 36a, 36b engaging upon touch with the sidewall connectors 64, 66. In embodiments in which inner couplers 37a, 37b are utilized, the liner 20 may be pressed down upon so as to engage each of the inner couplers 37a, 37b with corresponding couplers of the sidewall connectors 64, 66.

With the sides 23, 24 of the liner 20 so secured, the first end 21 of the liner 20 may be secured to the front end of the cargo area 61. In embodiments in which a rolled-up cover 50 is positioned near the front end of the cargo area 61, straps 68a, 68b may be looped to extend through each of the openings 28a, 28b near the first end 21 of the liner 20 and around the rolled-up cover 50. In embodiments in which such a cover 50 is omitted, the straps 68a, 68b may instead be secured to various openings, brackets, or other structures of the cargo area 61 while being looped through the openings 28a, 28b of the liner 20. In any case, the straps 68a, 68b function to secure the first end 21 of the liner 20 to the cargo area 61.

The manner in which the second end 22 of the liner 20 is secured to the cargo area 61 may vary in different embodiments. In an embodiment in which the cargo area 61 includes a tailgate 69, the second end 22 of the liner 20 may be partially wrapped around the tailgate 69 so as to line the inner surface of the tailgate 69 such as shown in FIGS. 1-4, 8, 9, 13, and 14. The second end 22 of the liner 20 is secured to the tailgate 69 by use of the securing connectors 40, 42, 44, 46. In some embodiments, the securing connectors 40, 42, 44, 46 may engage with each other as described previously. In other embodiments, securing straps 48a, 48b may be utilized in combination with the securing connectors 40, 42, 44, 46.

With the liner 20 secured to at least partially cover the cargo area 61, the cargo area 61 is ready for use. Various types of cargo 12 may then be loaded into the lined cargo area 61 of the vehicle 60, such as within a bed 62 of a pickup truck. The type of cargo 12 will vary depending on the user and should not be construed as limited in any manner. FIGS. 8 and 13 illustrate an embodiment with cargo 12 comprised of a hunting game (an animal such as a deer). By using the liner 20, the hunter is able to prevent his/her cargo area 61 (e.g. bed 62) from being exposed to biological fluids such as blood from the game.

Figure 4:
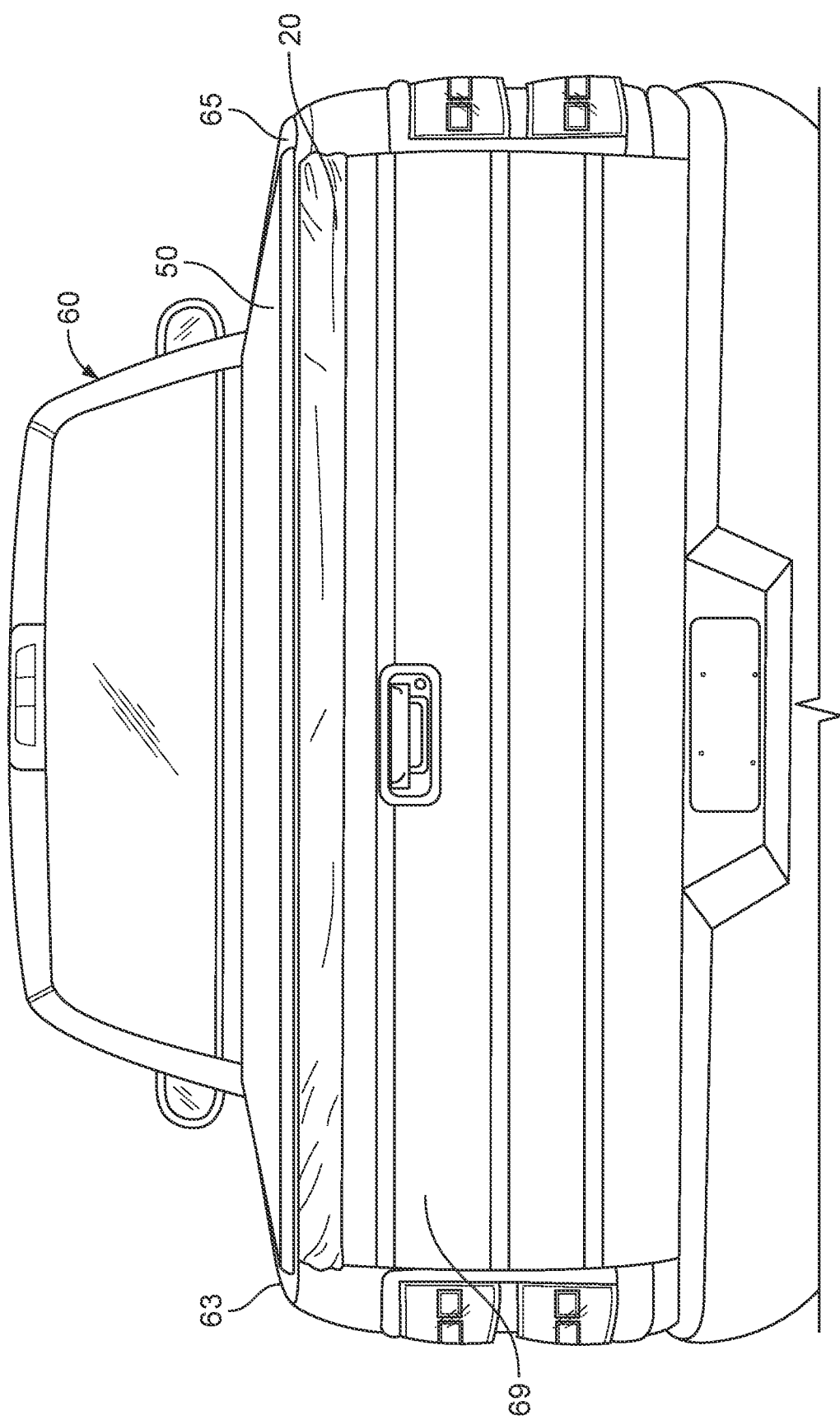
FIG. 4 is a rear view of a vehicle cargo area liner system in use with a closed cover in accordance with an example embodiment.

Once the cargo 12 is loaded into the lined cargo area 61, the cargo area 61 may be closed-off. The straps 68a, 68b may be removed from the openings 28a, 28b of the liner 20 and from around the cover 50. The cover 50 may then be unrolled in a manner such that the cover connectors 52a, 52b of the cover 50 engage with underlying outer connectors 30a, 30b on the outer surface 25 of the liner 20. Such a configuration is shown in FIGS. 3, 4, and 9, in which it can be seen that the cargo area 61, which is lined by the liner 20, is completely enclosed by the cover 50, with the cover 50 being secured to the liner 20 by the outer connectors 30a, 30b and cover connectors 52a, 52b. The vehicle 60 is now ready for transport.

Figure 15:
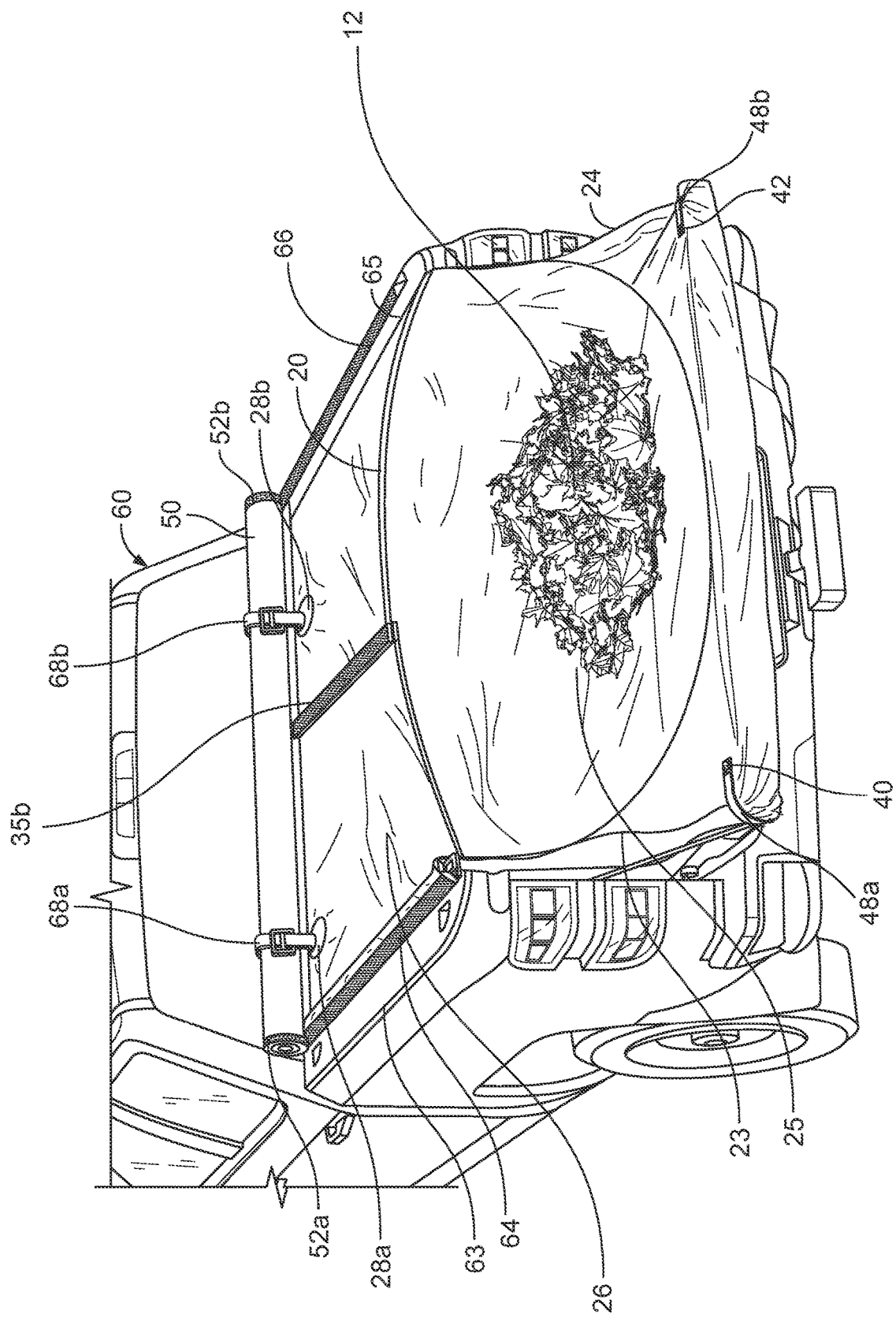
FIG. 15 is a perspective view of a liner folded onto itself of a vehicle cargo area liner system in accordance with an example embodiment.

If no separate cover 50 is provided, the liner 20 may be folded onto itself such as shown in FIG. 15. In such an embodiment, the respective sides 22, 23 of the liner 20 may be pulled up and towards each other to cover the top of the cargo 12 within the liner 20. The first end 21 of the liner 20 will remain connected to the cargo area 61 and the second end 22 of the liner 20 will remain connected to the tail gate 69, with the respective sides 23, 24 of the liner 20 being brought together and connected to each other so as to partially enclose the cargo 12 such as shown in FIG. 15.

Upon arriving at a destination, the cover 50 may first be removed, or the sides 23, 24 of the liner 20 may be disconnected from each other. In an embodiment such as shown in FIG. 1, the cover 50 may be rolled back up and secured in place by the straps 68a, 68b. The cargo 12 may then be removed from the cargo area 61. The liner 20 is then ready for removal. FIG. 14 illustrates an exemplary method of removing the liner 20. As can be seen, the straps 68a, 68b may be extended through the openings 28a, 28b of the liner 20 but not looped around any other structure. The operator may grasp the straps 68a, 68b and pull to remove the liner 20 from the cargo area 61. If straps 68a, 68b are not available, the operator may instead grasp the edges of the liner 20 or the openings 28a, 28b.

Before or after pulling the liner 20 to disengage the inner connectors 35a, 35b from the sidewall connectors 64, 66, the second end 22 of the liner 20 may be removed from the tailgate 69. The securing connectors 40, 42, 44, 46 may be disengaged from each other, and the second end 22 of the liner 20 removed from the tailgate 69. If securing straps 48a, 48b were utilized, the securing straps 48a, 48b may first be removed prior to removing the liner 20. With the liner 20 removed from the cargo area 61 of the vehicle 60; the liner 20 may be disposed or may be retained for cleaning, transport, or further use.

Unless otherwise defined, all technical and scientific terms used herein have the same meaning as commonly understood by one of ordinary skill in the art to which this invention belongs. Although methods and materials similar to or equivalent to those described herein can be used in the practice or testing of the vehicle cargo area liner system, suitable methods and materials are described above. All publications, patent applications, patents, and other references mentioned herein are incorporated by reference in their entirety to the extent allowed by applicable law and regulations. The vehicle cargo area liner system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A vehicle cargo area liner system, comprising:
   a flexible liner that at least partially covers an external cargo area of a vehicle, wherein the flexible liner is comprised of a first end, a second end, a first side, a second side, an outer surface, and an inner surface;
   a first inner connector positioned on the inner surface of the flexible liner that connects the flexible liner to the external cargo area of the vehicle;
   a second inner connector positioned on the inner surface of the flexible liner that connects the flexible liner to the external cargo area of the vehicle;
   a first outer connector positioned on the outer surface of the flexible liner that connects an external cover to the flexible liner; and
   a second outer connector positioned on the outer surface of the flexible liner that connects the external cover to the flexible liner.

2. The vehicle cargo area liner system of claim 1, wherein the first inner connector and the second inner connector are each comprised of hook-and-loop fasteners.

3. The vehicle cargo area liner system of claim 2, wherein the first outer connector and the second outer connector are each comprised of hook-and-loop fasteners.

4. The vehicle cargo area liner system of claim 1, wherein the first inner connector and the second inner connector are each comprised of snap couplers.

5. The vehicle cargo area liner system of claim 4, wherein the first outer connector and the second outer connector are each comprised of snap couplers.

6. The vehicle cargo area liner system of claim 1, wherein the first inner connector is comprised of a first strip extending along the first side of the inner surface of the liner and wherein the second inner connector is comprised of a second strip extending along the second side of the inner surface of the liner.

7. The vehicle cargo area liner system of claim 6, wherein the first outer connector is comprised of a third strip extending along the first side of the outer surface of the liner and wherein the second outer connector is comprised of a fourth strip extending along the second side of the outer surface of the liner.

8. The vehicle cargo area liner system of claim 1, wherein the liner comprises at least one opening positioned near the first end of the liner.

9. The vehicle cargo area liner system of claim 1, wherein the liner comprises one or more securing connectors positioned near the second end of the liner.

10. The vehicle cargo area liner system of claim 1, wherein the first outer connector and the second outer connector are each connected to the outer surface of the liner and wherein the first inner connector and the second inner connector are each connected to the inner surface of the liner.

11. The vehicle cargo area liner system of claim 1, wherein the vehicle is comprised of a pickup truck and wherein the cargo area is comprised of a bed of the pickup truck.

12. A vehicle cargo area liner system, comprising:
    a cover adapted to at least partially enclose a cargo area of a vehicle, wherein the cargo area includes a first sidewall with a first sidewall connector positioned on the first sidewall and wherein the cargo area includes a second sidewall with a second sidewall connector positioned on the second sidewall, wherein the cover includes:
a first cover connector positioned on a first side of the cover;
a second cover connector positioned on a second side of the cover; and
a liner that at least partially covers the cargo area of the vehicle, wherein the liner includes:
a first end, a second end, a first side, a second side, an outer surface, and an inner surface;
a first inner connector positioned on the inner surface of the liner that connects the liner to the cargo area of the vehicle, wherein the first inner connector engages the first sidewall connector;
a second inner connector positioned on the inner surface of the liner that connects the liner to the cargo area of the vehicle, wherein the second inner connector engages the second sidewall connector;
a first outer connector positioned on the outer surface of the liner that connects the cover to the liner, wherein the first outer connector engages the first cover connector; and
a second outer connector positioned on the outer surface of the liner that connects the cover to the liner, wherein the second outer connector engages the second cover connector.

13. The vehicle cargo area liner system of claim 12, wherein the first inner connector, the second inner connector, the first sidewall connector, and the second sidewall connector are each comprised of hook-and-loop fasteners.

14. The vehicle cargo area liner system of claim 13, wherein the first outer connector, the second outer connector, the first cover connector, and the second cover connector are each comprised of hook-and-loop fasteners.

15. The vehicle cargo area liner system of claim 12, wherein the first outer connector, the second outer connector, the first cover connector, and the second cover connector are each comprised of snap couplers.

16. The vehicle cargo area liner system of claim 13, wherein the first inner connector, the second inner connector, the first sidewall connector, and the second sidewall connector are each comprised of snap couplers.

17. The vehicle cargo area liner system of claim 12, further comprising a pair of securing connectors positioned near the second end of the liner that secures the liner to a tailgate of the vehicle.

18. The vehicle cargo area liner system of claim 17, further comprising a strap connected between the pair of securing connectors that secures the liner to the tailgate of the vehicle.

19. The vehicle cargo area liner system of claim 12, wherein the liner includes at least one opening near the first end of the liner and wherein the system further comprises a strap that extends through the at least one opening of the liner and around the cover.

20. A method of lining a cargo area of a vehicle using the vehicle cargo area liner system of claim 12, comprising the steps of:
attaching the first side of the liner to the first sidewall of the cargo area by engaging the first inner connector of the liner with the first sidewall connector of the first sidewall;
attaching the second side of the liner to the second sidewall of the cargo area by engaging the second inner connector of the liner with the second sidewall connector of the second sidewall;
attaching the first end of the liner to a front end of the cargo area by securing a strap through at least one opening of the liner and around the cover; and
attaching the second end of the liner to a tailgate of the cargo area by wrapping the second end of the liner around the tailgate of the cargo area.

21. A vehicle cargo area liner system, comprising:
a flexible cover exchangeable between at least a rolled-up configuration and an unrolled configuration, the flexible cover including a first cover connector and a second cover connector; and
a flexible liner that at least partially covers a cargo area of a vehicle, wherein the flexible liner is comprised of:
a first end, a second end, a first side, a second side, an outer surface, and an inner surface;
a first inner connector positioned on the inner surface of the flexible liner that connects the flexible liner to the cargo area of the vehicle;
a second inner connector positioned on the inner surface of the flexible liner that connects the flexible liner to the cargo area of the vehicle;
a first outer connector positioned on the outer surface of the flexible liner that is aligned with the first cover connector, wherein the first outer connector and first cover connector interface to connect the flexible cover to the flexible liner when the flexible cover is in the unrolled configuration;
a second outer connector positioned on the outer surface of the flexible liner that is aligned with the second cover connector, wherein the second outer connector and the second cover connector interface to connect the flexible cover to the flexible liner when the flexible cover is in the unrolled configuration.

22. The vehicle cargo area liner system of claim 21, wherein the first cover connector and the first outer connector additionally interface to connect the flexible liner to the flexible cover when the flexible cover is in the rolled-up configuration.

23. The vehicle cargo area liner system of claim 22, wherein the second cover connector and the second outer connector additionally interface to connect the flexible liner to the flexible cover when the flexible cover is in the rolled-up configuration.

24. The vehicle cargo area liner system of claim 21, wherein the first cover connector and the second cover connector are located only on an inner surface of the flexible cover.

25. The cargo area liner system of claim 21, wherein at least one opening is positioned near the first end of the liner and receives a strap therethrough, wherein the strap is wrapped about the flexible cover and secures the flexible cover when the flexible cover is in the rolled-up position.

26. The cargo area liner system of claim 21, wherein the first and second outer connectors of the flexible liner connected to the external cover enclose the external cargo area.

27. The cargo area liner system of claim 21, wherein the first and second outer connector of the flexible liner connected to the external cover partially enclose the external cargo area.

* * * * *